(12) United States Patent
Sexauer et al.

(10) Patent No.: US 11,301,818 B2
(45) Date of Patent: *Apr. 12, 2022

(54) LIVE MEETING OBJECT IN A CALENDAR VIEW

(71) Applicant: MICROSOFT TECHNOLOGY LICENSING, LLC, Redmond, WA (US)

(72) Inventors: Eric Randall Sexauer, Woodinville, WA (US); Ewin Davis Kannuthottiyil, Seattle, WA (US); Kevin Daniel Morrison, Arlington, MA (US); Amey Parandekar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,164

(22) Filed: Sep. 11, 2020

(65) Prior Publication Data

US 2020/0410457 A1   Dec. 31, 2020

Related U.S. Application Data

(63) Continuation of application No. 16/355,748, filed on Mar. 17, 2019, now Pat. No. 10,796,286.

(51) Int. Cl.
*G06Q 10/10* (2012.01)
*G06F 3/04817* (2022.01)
*G06F 3/0482* (2013.01)

(52) U.S. Cl.
CPC ....... *G06Q 10/1095* (2013.01); *G06F 3/0482* (2013.01); *G06F 3/04817* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 7,580,862 B1 * | 8/2009 | Montelo | G06Q 10/10 705/26.1 |
| 9,585,185 B1 * | 2/2017 | Sapkota | H04M 7/122 |
| 10,572,859 B1 * | 2/2020 | Evans | H04M 3/42068 |
| 2004/0143573 A1 * | 7/2004 | Burkey | G06Q 10/109 |
| 2006/0122875 A1 * | 6/2006 | Kolbe | G06Q 10/1053 705/321 |
| 2006/0136357 A1 * | 6/2006 | Rasmussen | G06Q 10/10 |

(Continued)

*Primary Examiner* — Mandrita Brahmachari
(74) *Attorney, Agent, or Firm* — Han Gim; Newport IP, LLC

(57) ABSTRACT

A representation of a calendar view is rendered on a user interface (UI). The calendar view is indicative of one or more calendar days comprising a time span including a plurality of sequential time slots. A representation of a scheduled meeting is rendered in at least one of the sequential time slots. The scheduled meeting is rendered without an icon or button operative to provide an interactive control to join the scheduled meeting. In response to determining that the scheduled meeting has started, the representation of the scheduled meeting is converted to a live meeting object and the representation of the scheduled meeting is replaced with the converted live meeting object. The live meeting object renders a live video or audio output of the scheduled meeting.

20 Claims, 16 Drawing Sheets

(56) References Cited

U.S. PATENT DOCUMENTS

| | | | | |
|---|---|---|---|---|
| 2008/0059618 A1* | 3/2008 | May | ............... | G06Q 10/109 709/223 |
| 2009/0100347 A1* | 4/2009 | Schemers | ............ | G06Q 10/109 715/751 |
| 2010/0005142 A1* | 1/2010 | Xiao | ............... | H04L 67/24 709/204 |
| 2011/0289142 A1* | 11/2011 | Whalin | ............... | G06Q 10/10 709/203 |
| 2012/0269334 A1* | 10/2012 | Goguen | ............... | H04M 3/56 379/202.01 |
| 2013/0253981 A1* | 9/2013 | Lipka | ............... | G06Q 30/0201 705/7.29 |
| 2014/0286134 A1* | 9/2014 | Bomgardner | ........ | G06Q 10/109 368/29 |
| 2014/0288990 A1* | 9/2014 | Moore | ............... | G06Q 10/107 705/7.19 |
| 2016/0247123 A1* | 8/2016 | Holst | ............... | G06Q 10/1095 |
| 2016/0291820 A1* | 10/2016 | Mak | ............... | G01C 21/34 |
| 2017/0357950 A1* | 12/2017 | Bennett | ............... | H04L 51/22 |
| 2018/0052837 A1* | 2/2018 | Kunieda | ............... | G06F 16/40 |
| 2018/0059881 A1* | 3/2018 | Agboatwalla | ....... | G06F 3/04883 |
| 2018/0365654 A1* | 12/2018 | Carver | ............... | G06Q 10/109 |
| 2020/0294000 A1 | 9/2020 | Sexauer et al. | | |
| 2020/0410456 A1 | 12/2020 | Sexauer et al. | | |

* cited by examiner

LIVE MEETING OBJECT IN A CALENDAR VIEW

CROSS-REFERENCE TO RELATED APPLICATION

This patent application claims the benefit of U.S. patent application Ser. No. 16/355,748, filed Mar. 17, 2019, entitled "LIVE MEETING OBJECT IN A CALENDAR VIEW," the entirety of which is hereby incorporated by reference.

BACKGROUND

Some computing systems provide interactive and collaborative environments that facilitate communication between two or more participants. Such systems may include a calendaring program configured to schedule and manage meetings and appointments. Although existing calendaring programs provide many features for scheduling meetings, inefficient interaction with calendaring programs can be detrimental to user productivity and use of computing resources. When calendaring applications do not optimize user engagement and information sharing, production loss and inefficiencies can result when a participant is unable to quickly and easily view meetings and interact with the meeting context. For example, some calendaring applications may require that users open calendar items and perform a number of menu-driven tasks to zoom into areas of interest. Thus, when a participant needs further detail on a meeting, the participant must go to the date of the meeting, open the meeting, and click on a meeting link to find further information and to access interactive options. It is with respect to these considerations and others that the disclosure made herein is presented.

SUMMARY

Many calendar applications present schedule information in a static format. Details of a calendar event may not be updated in a dynamic and real-time manner, and pertinent details may not be readily available unless the calendar event is opened or otherwise further activated. By the use of the technologies described herein, information for a calendar event is presented in a dynamic format that allows for timely and useful information to be rendered directly within the calendar view. The dynamic view may include real-time updates as to the status of a calendar event as well as interactive capabilities provided directly on a representation of the calendar event within the calendar view.

In various embodiments, an existing calendar item for a meeting may be automatically converted to a live meeting object within the calendar view. In an embodiment, an existing calendar item for a meeting may be updated before a set start time of the meeting, to include and display a "join" control. The join control may be configured so that a user can directly join the meeting from the calendar view without having to open the details of the calendar item. While some collaborative e user interfaces may provide a meeting "join" control, this capability is typically provided only when a calendar item is further engaged by the user, such as opening the calendar item, opening and selecting a menu option, or launching an application other than the calendaring application. In some cases, the user must select a detailed meeting view which requires multiple clicks to open and access details of the meeting.

In various embodiments, the state of a calendar item may be dynamically updated based on the context such as the current time and date. For example, a calendar item may initially describe the title of a meeting, but not display a "join" button prior to the start time of the meeting. Generally, when a plurality of calendar items are displayed, such as in a full day calendar view or a full week calendar view, such interactive options are not typically rendered for meetings displayed within the full day calendar view or full week calendar view. In an embodiment, when a threshold time is reached prior to the meeting start time, such as fifteen minutes before the start time, the "join" control may be added to the calendar item. The "join" control may be added while the user interface is in the calendar view and without the need for any specific input from the user. Furthermore, the "join" control may be rendered on the calendar item, or multiple calendar items, within a calendar view that may include a plurality of date ranges and calendar items within those date ranges. The "join" control may be rendered during the entire time that the meeting is live. Clicking on the "join" button may, for example, take user to a pre join screen or launch an application to join the meeting.

In one embodiment, a calendar item may further provide an indication that a meeting is live. In addition to adding a "join" button, the calendar item may provide a visual indication such as a change in color to indicate that the meeting is live. The visual indication and adding of the "join" button may be in addition other notifications for the meeting that may be provided across other interfaces and form factors which have interfaces to the calendar item.

Once a meeting is live, additional information and controls may be provided to enable further contextual awareness of the meeting. For example, icons may be rendered on the calendar item to indicate the number of participants who have joined the meeting. In one embodiment, an icon may be rendered for each participant who has joined the meeting. In another embodiment, the elapsed time for the meeting may be rendered, indicating how long the meeting has been live.

In some embodiments, an "RSVP" option may be rendered on the calendar item. By responding to the "RSVP" option by clicking or otherwise activating the option, the user may directly accept or decline the meeting while in the calendar view. An indication may be provided to the organizer of the meeting to indicate whether the user will attend the meeting.

In an embodiment, the calendar item may further provide indications as to the current content of the meeting. For example, if a presentation or document is being shared, a preview window may be rendered on the calendar item. As another example, a video camera view can be rendered on the calendar item. By providing such information, participants who plan to participate in a portion of a meeting may selectively join the meeting using the meeting preview to optimize the time spent in the meeting.

In an embodiment, a preview icon may be rendered, allowing the user to preview recent messages/conversations within the calendar item. In an embodiment, a chat icon may be rendered. When recent chat activity is available, the chat icon may provide have an indicator (e.g., red dot). By clicking on the chat icon, the user may be taken to a conversation preview.

In an embodiment, a notes icon may be rendered, where the calendar item may indicate that new notes have been added to the meeting. The icon may also indicate recent notes activity by rending a red bubble or dot on the icon. The notes may include those that were added by participants of the meeting via a collaboration platform that is being used to facilitate the meeting.

In an embodiment, a whiteboard icon may be rendered, which may indicate that a new whiteboard has been added to the meeting. The whiteboard icon may indicate recent whiteboard activity by rendering a red bubble or dot on the icon. The whiteboard may be a tool for allowing participants of the meeting to draw or write shared inputs via the collaboration platform that is being used to facilitate the meeting.

In an embodiment, a recording icon may be rendered, which may indicate that a recording is available for viewing. The recording icon may indicate recent activity by rendering a red bubble or dot on the icon. The recording may include video and/or audio recordings captured by a recording tool that may be part of the collaboration platform that is being used to facilitate the meeting.

In an embodiment, a files icon may be rendered, which may indicate that a new file has been added to the meeting. The files icon may indicate recent activity by rendering a red bubble or dot on the icon. The files may include those that were added or shared by participants of the meeting via the collaboration platform that is being used to facilitate the meeting.

In an embodiment, a share icon may be rendered, which the user may click or otherwise activate to forward/share the current meeting with other participants or add to a meeting channel. The meeting may be shared or forwarded as a meeting object that can be received by invited participants via email or other messaging systems.

In an embodiment, the calendar item may further provide interactive options after the meeting has concluded. For example, the calendar item may provide an indication that a meeting has ended, such as a change in color to indicate that the meeting is no longer live. Once a meeting has ended, additional information may be provided to enable further interaction with the content of the meeting. For example, icons may be rendered on the calendar item to indicate the participants who participated in the meeting. In an embodiment, the calendar item may further provide a way to view or listen to recent activity, such as a playback of a recording of the meeting, access to chat transcripts, and to access the content that was shared at the meeting. For example, if a presentation or document was shared, options may be provided on the calendar item to access the files or documents, contact the meeting participants, etc.

A dynamic calendar item as described herein may be referred to as a meeting object or an interactive calendar surface. The meeting object or interactive calendar surface may facilitate a shared meeting and communication environment that improves collaboration and other activities. The data that may be provided on the interactive calendar surface may include but is not limited to video, imagery, 3D models, office applications, captured environments/objects, annotations, presentation, shared locations, notes, expressions, or other shared activity.

In some embodiments, an additional interactive calendar surface layer may be implemented over the active interactive calendar surface that is viewable to the user and may be manipulated as an independent object. For example, the additional interactive calendar surface object may be independently saved, forwarded to other users, modified, annotated, added as an object to other applications and files, and treated as a recipient of other files and objects. The meeting object may be addressable, actionable, and searchable as a conversational object. The meeting object can be edited, for example to condense or select highlights of the meeting, before sending out the object in the same or a different context.

Data from a number of resources can be utilized to provide contextually-aware information for calendar items in the calendar view. Such technologies can improve user interaction with a computing device by automatically generating and displaying timely and relevant information without requiring users to open a calendar event, conduct a search, or manually access a number of resources. Among many benefits provided by the technologies described herein, a user's interaction with a device may be improved, which may reduce the number of inadvertent inputs, reduce the consumption of processing resources, and mitigate the use of network resources. Other technical effects other than those mentioned herein can also be realized from implementations of the technologies disclosed herein. Existing systems for allowing users to manually interact with calendar items typically require users to perform a number of tasks. The user can spend a considerable amount of time searching through available calendar items to find and change settings, invoke additional applications to perform functions that are not native to the calendar application, and to find content that is associated with the scheduled activity. This can lead to extensive and unnecessary consumption of computing resources.

The examples described herein may be provided within the context of collaborative environments, e.g., scheduled calendar events, group meetings, live broadcasts, etc. For illustrative purposes, it can be appreciated that a computer managing a calendaring environment involves any type of computer that can access a user's calendar data and manage a communication session where two or more computers are sharing data. For illustrative purposes, an "event" is a particular instance of a communication session, which may have a start time, an end time, and other parameters for controlling how data is shared and displayed to users participating in the communication session.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Figure 1:
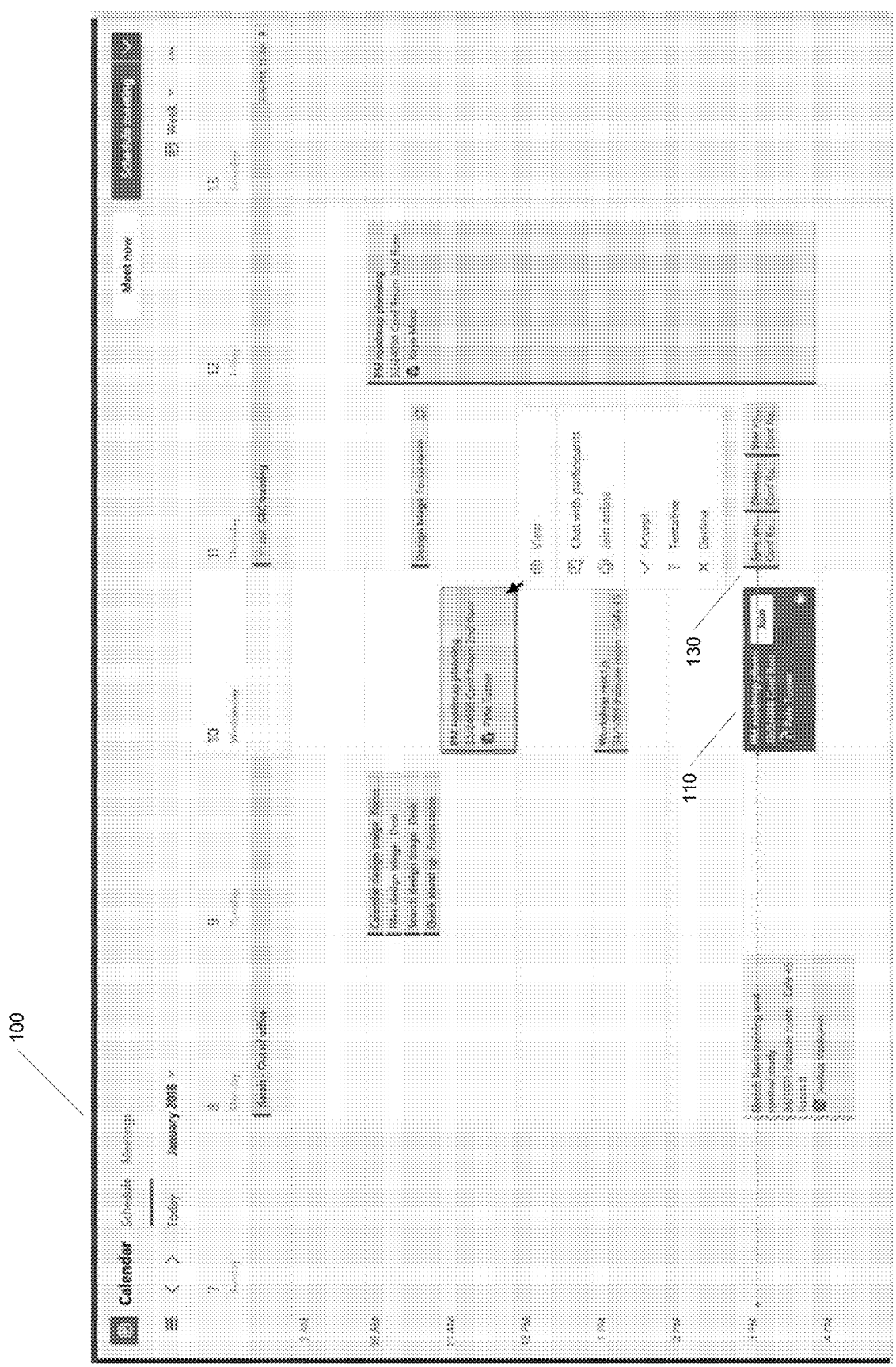
FIG. 1 is an example user interface illustrating aspects of a calendaring environment for the embodiments disclosed herein.

The following Detailed Description describes an improved interface for viewing and interacting with calendar events that are rendered in a representation of a calendar. Various embodiments are disclosed that enable productive discovery and management of past, present and future calendared activity for users. This can result in more efficient use of computing resources such as processor cycles, memory, network bandwidth, and power, as compared to previous solutions relying upon inefficient interaction with a rendered calendar environment and objects within the rendered calendar environment. Technical benefits other than those specifically described herein might also be realized through implementations of the disclosed technologies.

Calendar objects are typically representations of scheduled events in a calendaring application that is configured to provide an electronic representation of a calendar. The representation may include a calendar showing dates and days of the week and a list of appointments. The calendaring application may be a local application designed for individual use or may be a networked application that allows for the sharing of calendar information in an interactive and collaborative environment. Examples of calendaring software include WINDOWS LIVE CALENDAR, GOOGLE CALENDAR, or MICROSOFT OUTLOOK.

A scheduled and networked meeting represents one popular form of electronic collaboration that utilizes an interactive application program (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., SKYPE, and SKYPE FOR BUSINESS and TEAMS provided by MICROSOFT CORPORATION, of Redmond, Wash.) to facilitate communication between two or more participants. Participants of a communication session in a networked meeting are able to exchange live video, audio, and other types of content to view, hear, and otherwise share information. Various types of computing devices can be utilized to participate in networked meetings including, but not limited to, smartphones, tablet computing devices, set-top boxes, smart televisions, video game systems, and AR, VR, and MR devices.

Many calendaring applications present schedule information in a static format. Details of a calendar event may not be updated in a dynamic and real-time manner and relevant calendar information not be readily available unless the calendar event is opened or otherwise further activated. Various embodiments are disclosed for implementing an improved interface for viewing and interacting with calendar objects of a calendaring application. In one embodiment, an interactive calendar surface is disclosed that is operable to facilitate a user's interaction with the content of a calendar event as well as interaction with other participants of the calendar event, all within a calendar view of the calendaring application. The enabled user interactions may include updating meeting content, sharing of the meeting content, interacting with other participants, and joining the meeting. By the use of the technologies described herein, information for a calendar event is presented in a dynamic format that allows for timely and useful information to be rendered directly within the calendar view. The dynamic view may include real-time updates as to the status of a calendar event as well as interactive capabilities provided directly on a representation of the calendar event within the calendar view.

In some embodiments, the interactive calendar surface may automatically convert an existing calendar item for a meeting to a live meeting object within the calendar view. In an embodiment, illustrated in FIG. 1 is an example calendar view 100 rendered on a user interface (UI), including a calendar item 110. The calendar view 100 may be indicative of one or more calendar days, the calendar days comprising a time span including a plurality of time slots.

The calendar item 110 may be updated before a set start time of the meeting, to include and display a "join" control 130 within the calendar view. The join control 130 may be configured so that user can directly join the meeting from the converted calendar view without having to open the details of the calendar item. The join control 130 may have at least a selectable region that is configured to indicate that the scheduled meeting is to be joined. While some existing user interfaces provide a "join" button, this capability is typically provided when the calendar item is further engaged by the user, such as opening the calendar item, opening and selecting a menu option, or otherwise further moving away from the calendar view. In some cases, the user must select a detailed view which requires multiple clicks to open and access details of the meeting.

In various embodiments, the state of a calendar item may be dynamically updated based on the context such as the current time and date. Contextual information may also be based on other information such as user preferences, whether the organizer of the meeting has started the meeting, and other factors. In one embodiment, a calendar item may provide meeting title, date, time, and location, but may not initially display a "join" button prior to the start time of the meeting, prior to a time threshold, or other criteria. When a plurality of calendar items are displayed, such as in a full day calendar view or a full week calendar view, such interactive options are not typically rendered on a calendar item. In an embodiment, when a threshold time is reached prior to the meeting start time, such as fifteen minutes before the start time, the state of the calendar meeting may be updated, and a "join" control may be added to the calendar item. The "join" control may automatically be added while the calendaring application is presenting in the calendar view and without the need for any specific input from the user. Furthermore, the "join" control may be rendered on the calendar item, or multiple calendar items, within the calendar view that may include a plurality of date ranges and calendar items within those date ranges, without the user having to open the calendar item.

In one embodiment, the calendar item may further provide an indication that a meeting is live. In addition to adding a "join" button, in the example illustrated in FIG. 1, the calendar item 110 may further provide a visual indication such as a change in color to indicate that the meeting is live.

The visual indication and adding of the "join" button may be in addition other notifications for the meeting that may be provided across multiple interfaces and form factors which have interfaces to the calendar item. In an embodiment, the "join" control may continue to be rendered during the entire time that the meeting is live.

In some embodiments, an "RSVP" option may be rendered on the calendar item. By responding to the "RSVP" option by clicking or otherwise activating the option, the user may directly accept or decline the meeting while in the calendar view. An indication may be provided to the organizer of the meeting to indicate whether the user will attend the meeting.

In some embodiments, once a meeting is live, additional information may be provided to enable further contextual awareness of the meeting. For example, icons may be rendered on the calendar item to indicate the number of participants who have joined the meeting. In one embodiment, an icon may be rendered for each participant who has joined the meeting.

In some embodiments, the calendar item may further provide indications as to the content that is being discussed or presented at the meeting. In an embodiment, a dynamic calendar item as described herein may be referred to as an interactive calendar surface. The interactive calendar surface may facilitate a shared meeting and communication environment that improves collaboration and other activities. The data that may be provided on the interactive calendar surface may include but is not limited to video, imagery, 3D models, office applications, captured environments/objects, annotations, presentation, shared locations, notes, expressions, or other shared activity.

The interactive calendar surface may facilitate interaction with source data for content that is a part of the calendar event. For example, if a presentation or document is being shared, a preview window may be rendered on the calendar item. As another example, a video camera view can be rendered on the meeting object. By providing such information, participants who are engaged in a portion of a longer meeting may selectively join a meeting, using the meeting preview to optimize the time spent in the meeting. This allows users to quickly have access to meeting content rather than searching for the content as a separate task and opening an application to view an image of the content. The interactive calendar surface thus provides a focused view of content that is contextually available to the group during the course of the calendar event.

The meeting object may be opened to provide further details for the event. In some embodiments, the meeting object may be sent to users who may access the meeting by interacting with the object. For example, a recipient of the meeting object may be able to click on the meeting object to join the meeting or to view details about the meeting.

In some embodiments, actions available to the meeting object or interactive calendar surface may be dynamically updated based on the detected activity in the room. For example, if a presentation is being rendered on a display within the rendered environment, the interactive calendar surface may be updated to include a thumbprint of the displayed presentation.

Data from a number of resources can be utilized to provide contextually-aware information for calendar items. Such technologies can improve user interaction with a computing device by automatically generating and displaying timely and relevant information without requiring users to open a calendar event, conduct a search, or manually access a number of resources. Among many benefits provided by the technologies described herein, a user's interaction with a device may be improved, which may reduce the number of inadvertent inputs, reduce the consumption of processing resources, and mitigate the use of network resources. Other technical effects other than those mentioned herein can also be realized from implementations of the technologies disclosed herein.

In some embodiments, the actions available on the interactive calendar surface may be based on an assigned role for the user. For example, some users may be assigned a meeting leader role and may be allowed to edit content before the content is shared. Other users may have a participant role or a group role and may be allowed to control their own settings or collectively control settings for the group.

In an embodiment, the meeting object may further provide interactive options after the meeting has concluded. For example, the meeting object may provide an indication that a meeting has ended, such as a change in color to indicate that the meeting is no longer live. Once a meeting has ended, additional information may be provided to enable further interaction with the content of the meeting. For example, icons may be rendered on the calendar item to indicate the participants who have joined the meeting. In an embodiment, the calendar item may further provide a way to view or listen to recent activity, such as a playback of a recording of the meeting, access to chat transcripts, and to access the content that was shared at the meeting. For example, if a presentation or document was shared, options may be provided on the meeting object to access the files or documents, contact the meeting participants, etc.

In some embodiments, the actions and features that are activated by the user during an editing/viewing session may be recorded and may be replayed by the user. In some embodiments, captured images of the meeting may be linked to a time window. For example, an image from the meeting that is selected for editing may be associated with a default time window such as 30 seconds. The interactive calendar surface may provide a timeline tool to traverse the timeframe during which the activity occurred and for which a recording is available. In this way, the user may view various times of the activity, from the perspective of the image, and further be provided various editing options over the available timeframes.

In some embodiments, an additional interactive calendar surface layer may be implemented over the active interactive calendar surface that is viewable to the user and may be manipulated as an independent object. For example, the additional interactive calendar surface object may be independently saved, forwarded to other users, modified, annotated, added as an object to other applications and files, and treated as a recipient of other files and objects. The meeting object may be addressable, actionable, and searchable as a conversational object. The meeting object can be edited, for example to condense or select highlights of the meeting, before sending out the meeting in the same or a different context.

Turning now to the figures (which might be referred to herein as a "FIG." or "FIGS."), additional details will be provided regarding an improved calendar interface disclosed herein with reference to the accompanying drawings. The figures show, by way of illustration, specific configurations or examples. Like numerals represent like or similar elements throughout the FIGS. In the FIGS., the left-most digit(s) of a reference number generally identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

It should be appreciated that various aspects of the subject matter described briefly above and in further detail below can be implemented as a hardware device, a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, network appliances, and the others.

Figure 2:
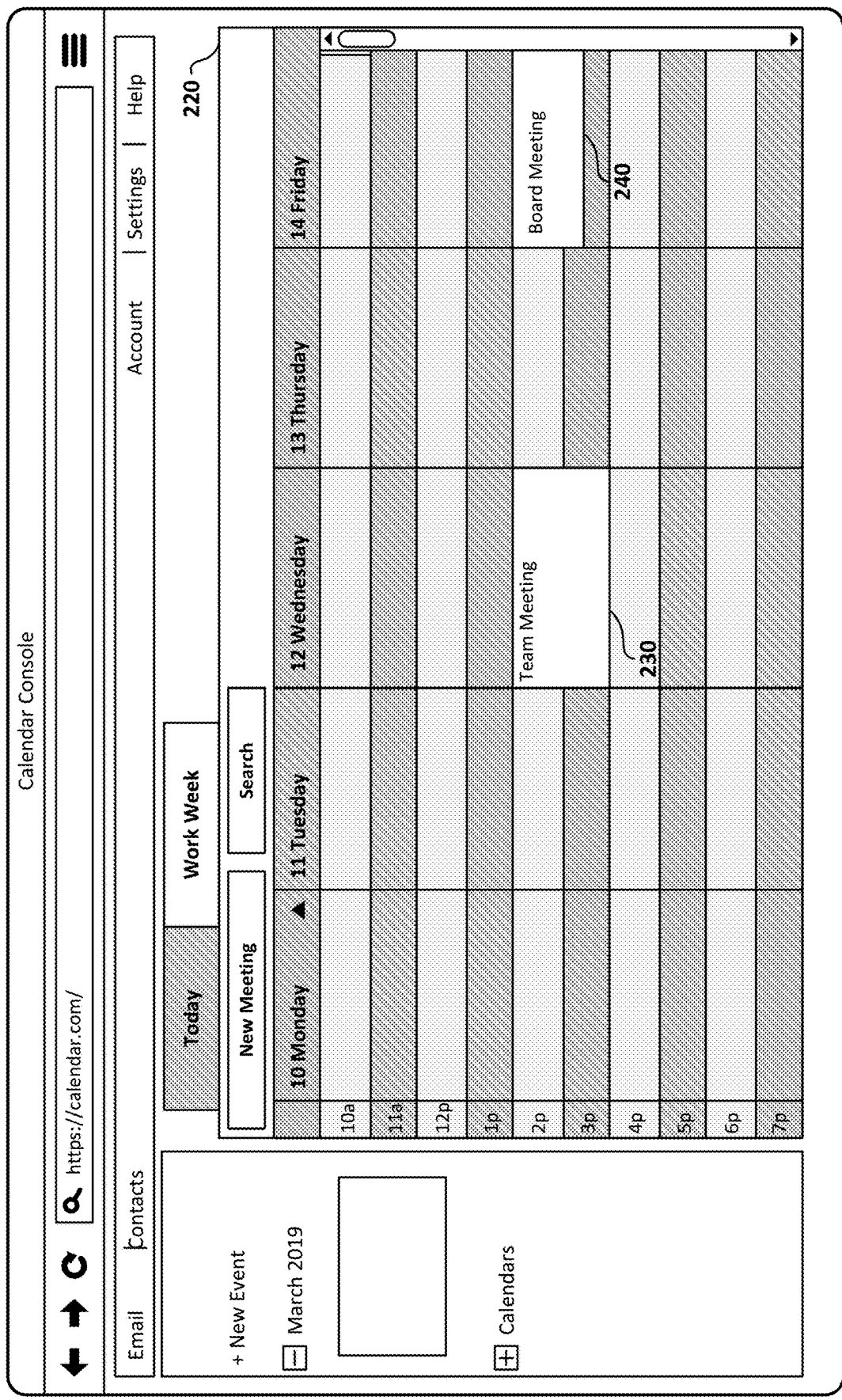
FIG. 2 illustrates an example display, according to one embodiment disclosed herein.

FIG. 2 illustrates an example of a user interface 200 where a calendaring application 210 is rendered before a dynamic calendar event update. The calendaring application 210 illustrated in FIG. 2 may represent a variety of applications, including but not limited to Microsoft® Teams, Skype for Business®, and Microsoft Office® products. The calendaring application 210 may display a representation of a calendar view on the user interface 200. The calendar view may include one or more calendar days, the calendar days comprising a time span including a plurality of time slots. Scheduled meetings 230 and 240 may be rendered in at least some of the time slots. The scheduled meetings are initially rendered without an interactive control to join the scheduled meetings.

Figure 3:
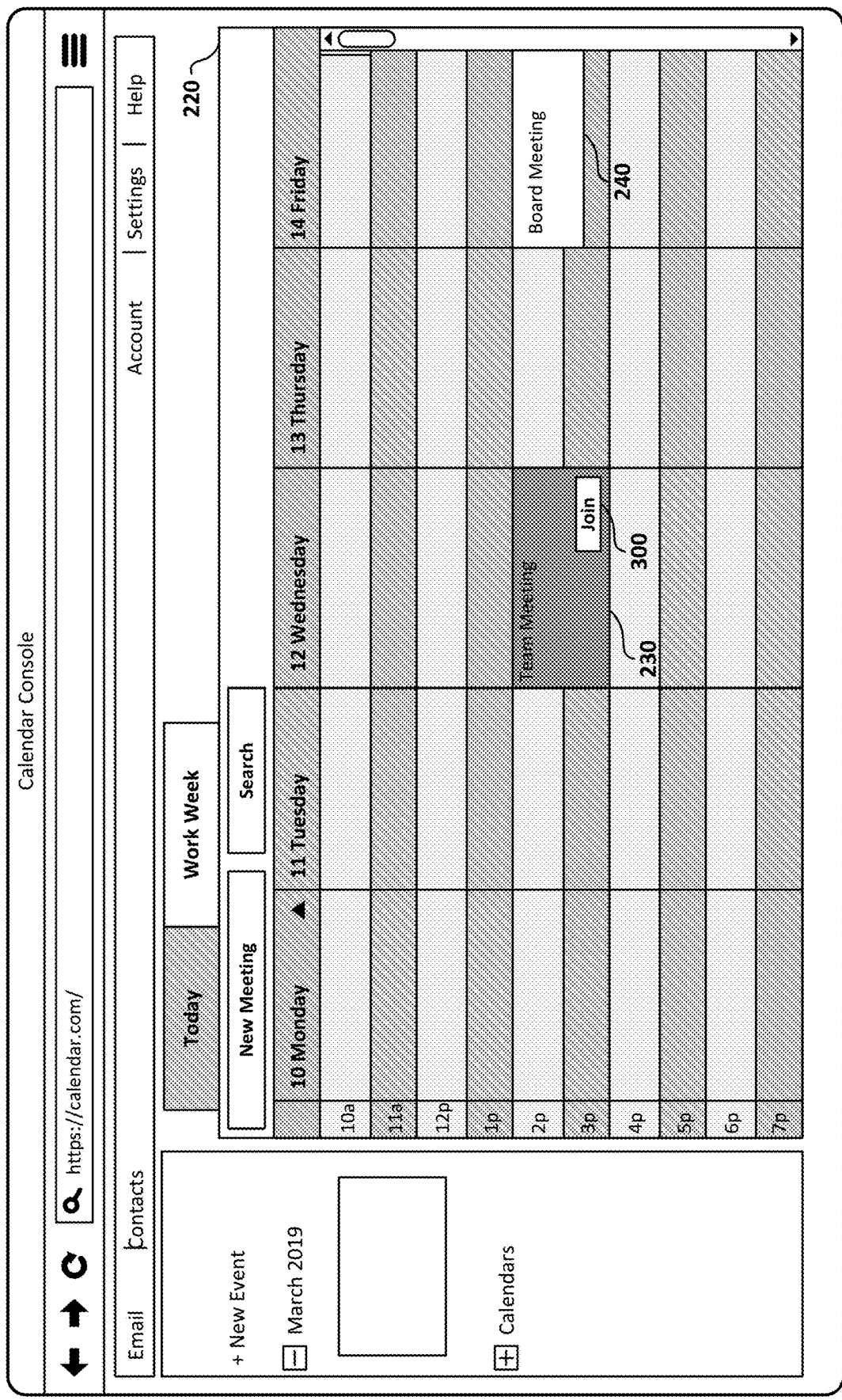
FIG. 3 illustrates an example display, according to one embodiment disclosed herein.

Referring to FIG. 3, the state of the calendar item 230 may be dynamically updated based on the context such as the current time and date. For example, when a threshold time is reached prior to the meeting start time of calendar item 230, such as fifteen minutes before the start time, the "join" control 300 may be added to the calendar item 230. The "join" control 300 may be added while the user interface is in the calendar view and without the need for any specific input from the user. Furthermore, the "join" control 300 may be rendered on the calendar item 230 within the calendar view that may include a plurality of date ranges and calendar items within those date ranges. The "join" control 300 may be rendered during the entire time that the meeting is live. Clicking on the "join" button may, for example, take user to a pre join screen or launch an application to join the meeting.

In one embodiment, calendar item 230 may further provide an indication that a meeting is live. In addition to adding a "join" button 300, the calendar item 230 may provide a visual indication such as a change in color to indicate that the meeting is live.

Figure 4:
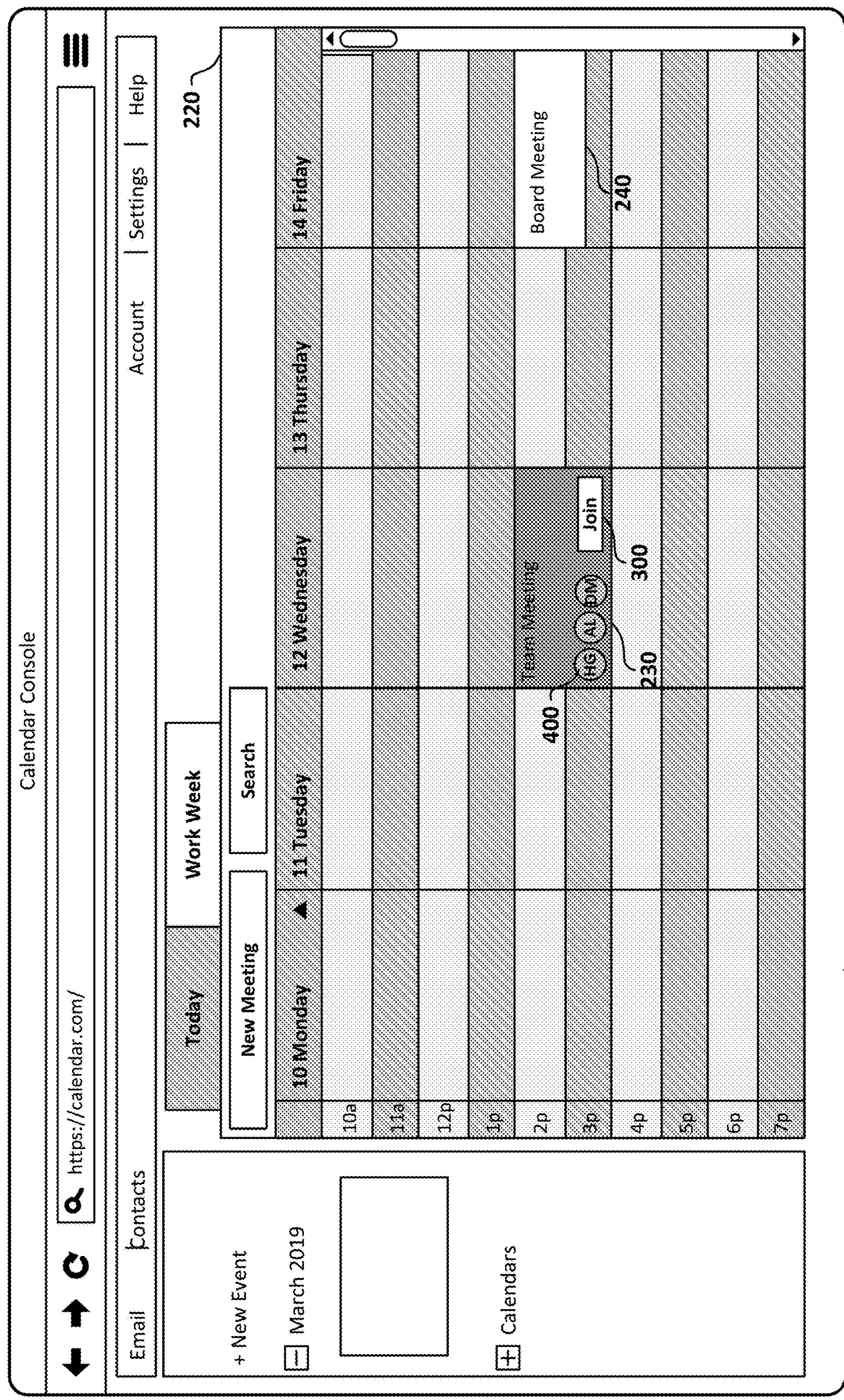
FIG. 4 illustrates an example display, according to one embodiment disclosed herein.

Once a meeting is live, additional information may be provided to enable further contextual awareness of the meeting. For example, referring to FIG. 4, icons 400 may be rendered on the calendar item to indicate the number of participants and identity of participants who have joined the meeting. In one embodiment, an icon may be rendered for each participant who has joined the meeting.

Figure 5:
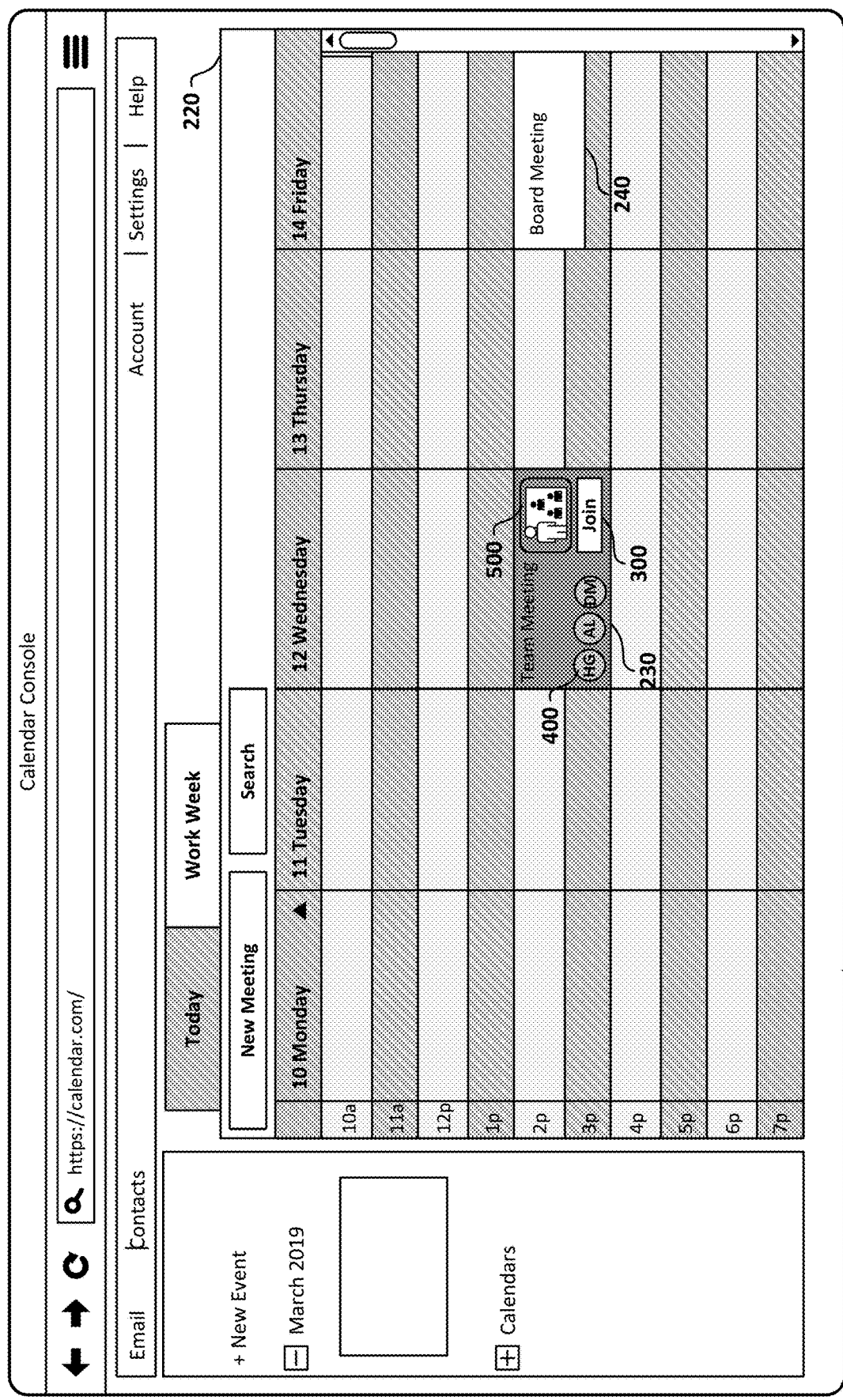
FIG. 5 illustrates an example display, according to one embodiment disclosed herein.

In an embodiment, the calendar item may further provide indications as to the current content of the meeting. For example, referring to FIG. 5, if a presentation or document is being shared, a preview window 500 may be rendered on the calendar item. As another example, the preview window 500 may include a video camera view.

Figure 6:
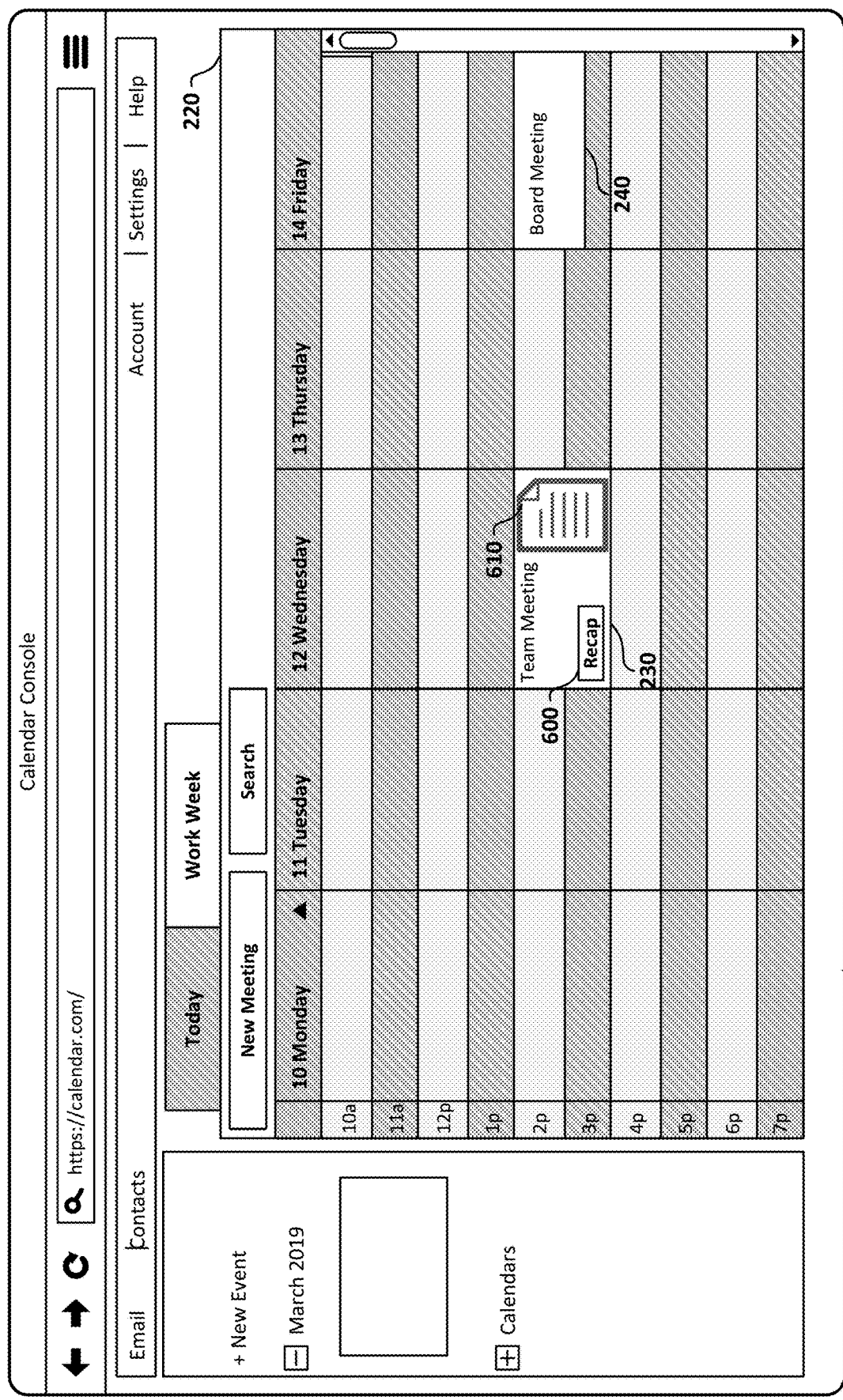
FIG. 6 illustrates an example display, according to one embodiment disclosed herein.
Figure 7:
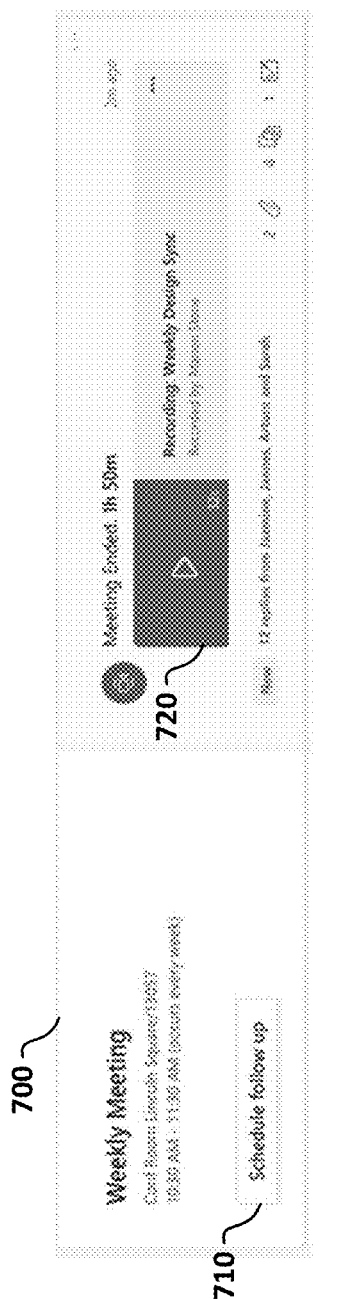
FIG. 7 is an example user interface illustrating aspects of a calendaring environment for the embodiments disclosed herein.

In an embodiment, the calendar item 230 may further provide interactive options after the meeting has concluded. For example, referring to FIG. 6, the calendar item 230 may provide an indication that a meeting has ended, such as a change in color to indicate that the meeting is no longer live. Furthermore, the "join" button may be removed. Once a meeting has ended, additional information may be provided to enable further interaction with the content of the meeting. For example, icons may be rendered on the calendar item to indicate the participants who participated the meeting. In an embodiment illustrated in FIG. 6, the calendar item 230 may further provide an icon 600 to view or listen to recent activity, such as a playback of a recording of the meeting, chat transcripts, and to access the content that was shared at the meeting. For example, if a presentation or document was shared, an icon 610 may be provided on the calendar item to access the files or documents. In one embodiment illustrated in FIG. 7, selection of icon 600 or 610 may open a UI 700 that provides further details of the meeting. A follow-up button 710 may be provided to enable the user to schedule a follow up meeting. Additionally, a meeting playback control 720 may be provided to launch a playback of a recording of the meeting.

Figure 8:
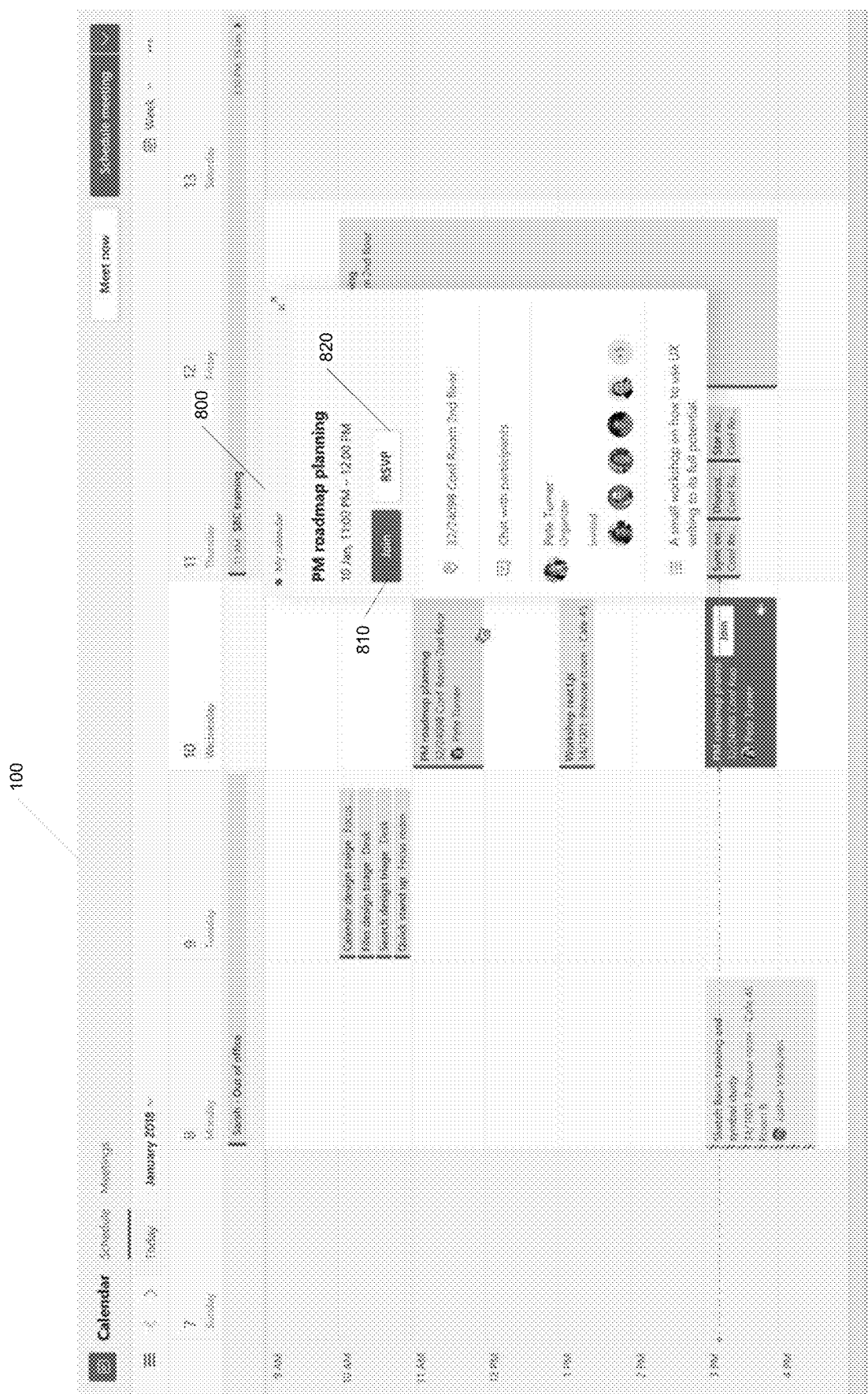
FIG. 8 is an example user interface illustrating aspects of a calendaring environment for the embodiments disclosed herein.

FIG. 8 illustrates that while some features may be accessible for a meeting in calendar view 100, a calendar item may be opened to provide further details in a pane 800. Pane 800 may include options for engaging in the meeting such as join button 810 and RSVP button 820.

Figure 9:
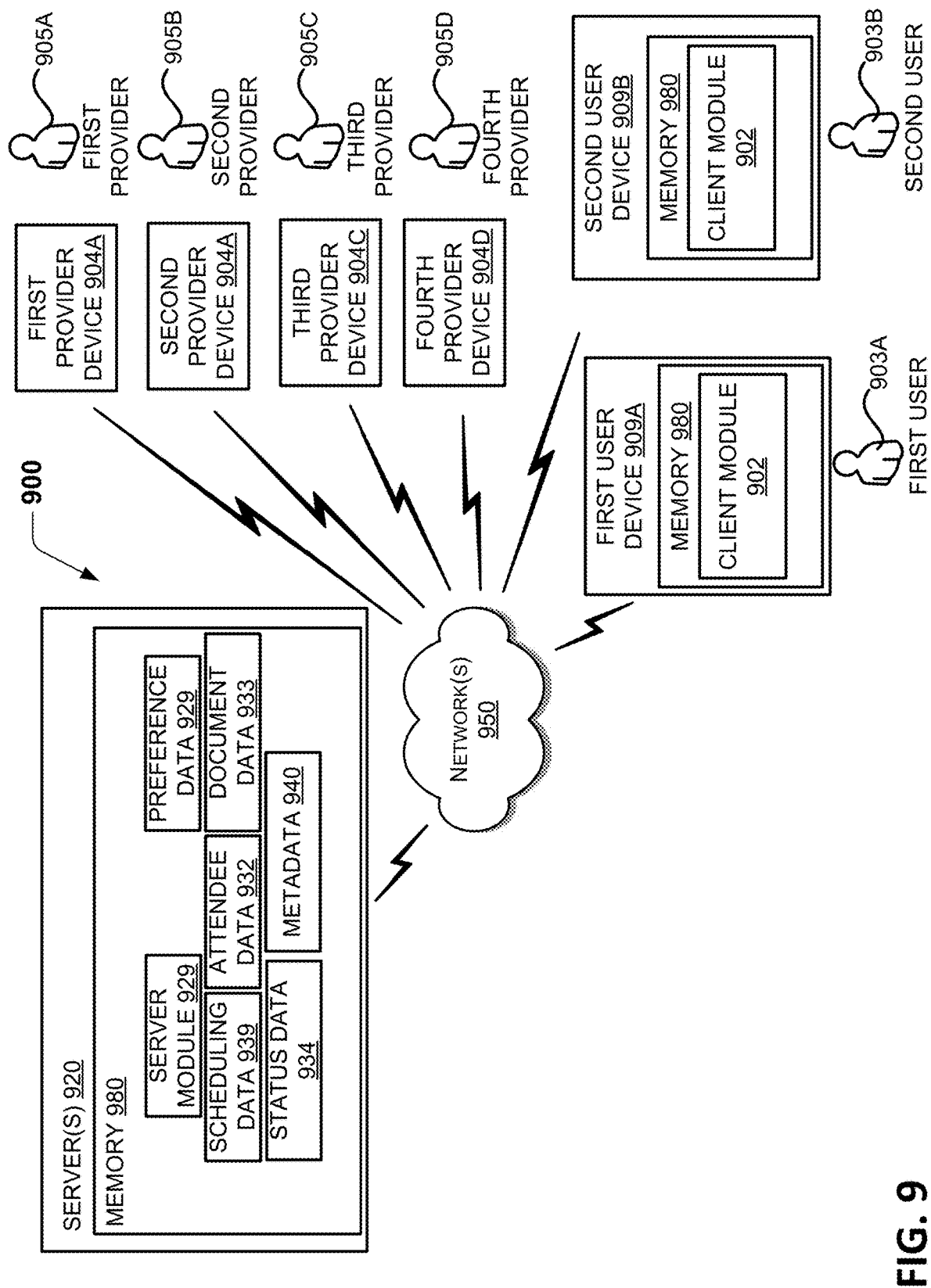
FIG. 9 is a computing system diagram showing aspects of an illustrative operating environment for the technologies disclosed herein.

FIG. 9 is a block diagram showing aspects of one example environment 900, also referred to herein as a "system 900," disclosed herein for providing dynamic updating of calendar events. In one illustrative example, the example environment 900 can include one or more servers 920, one or more networks 950, one or more user devices 909A-909B (collectively "user devices 909"), one or more provider devices 904A-904D (collectively "provider devices 904"), and one or more resources 906A-906E (collectively "resources 906"). The user devices 909 can be utilized for interaction with one or more users 903A-903B (collectively "users 903"), and the provider devices 904 can be utilized for interaction with one or more service providers 905A-905D (collectively "service providers 905"). This example is provided for illustrative purposes and is not to be construed as limiting. It can be appreciated that the example environment 900 can include any number of devices, users, providers, and/or any number of servers 920.

For illustrative purposes, the service providers 905 can be a company, person, or any type of entity capable of providing services or products for the users 903, which can also be a company, person or other entity. For illustrative purposes, the service providers 905 and the users 903 can be generically and individually referred to herein as "users." In some configurations, a data object may include one or more calendar events. Contextual data can be analyzed to determine one or more calendar events that can be updated dynamically.

The user devices 909, provider devices 904, servers 920 and/or any other computer configured with the features disclosed herein can be interconnected through one or more local and/or wide area networks, such as the network 950. In addition, the computing devices can communicate using any technology, such as BLUETOOTH, WIFI, WIFI DIRECT, NFC or any other suitable technology, which may include light-based, wired, or wireless technologies. It should be appreciated that many more types of connections may be utilized than described herein.

A user device 909 or a provider device 904 (collectively "computing devices") can operate as a stand-alone device, or such devices can operate in conjunction with other computers, such as the one or more servers 920. Individual computing devices can be in the form of a personal computer, mobile phone, tablet, wearable computer, including a head-mounted display (HMD) or watch, or any other computing device having components for interacting with one or more users and/or remote computers. In one illustrative example, the user device 909 and the provider device 904 can include a local memory 980, also referred to herein as a "computer-readable storage medium" or "non-transitory computer-readable storage medium" configured to store data, such as a client module 902 and other contextual data described herein.

The servers 920 may be in the form of a personal computer, server farm, large-scale system or any other computing system having components for processing, coordinating, collecting, storing, and/or communicating data between one or more computing device. In one illustrative example, the servers 920 can include a local memory 980, also referred to herein as a "computer-readable storage medium," configured to store data, such as a server module 929 and other data described herein. The servers 920 can also include components and services, such as the application services and shown in FIG. 9, for providing, receiving, and processing calendar data and executing one or more aspects of the techniques described herein. As will be described in more detail herein, any suitable module may operate in conjunction with other modules or devices to implement aspects of the techniques disclosed herein.

In some configurations, an application programming interface (API) exposes an interface through which an operating system and application programs executing on the computing device can enable the functionality disclosed herein. Through the use of this data interface and other interfaces, the operating system and application programs can communicate and process contextual data and modify scheduling data as described herein.

The scheduling data 939 can define appointments for the users 903 and the providers 905. The scheduling data 939 can define a start time and an end time. The scheduling data 939 can also include location data if an appointment is associated with a geographic location, global coordinates, and other information identifying a location. The scheduling data 939 can define a single appointment or a series of appointments. In addition, the scheduling data 939 can include communication information such as a phone number, IM address, URL, or other information for facilitating a voice or video conference. The scheduling data 939 can also include a text description of an appointment and other data indicating a topic, service category, a user 903 and/or a provider 905. The scheduling data 939 can be stored on the server 920, user device 909, provider device 904, or any suitable computing device, which may include a Web-based service.

The attendee data 932 may include a listing of a number of attendees that are scheduled for a meeting. The attendee data 932 can also be based on scheduling data 939. The document data 933 may include documents that are shared during a meeting. The status data 934 can define the availability of one or more parties. For instance, status data 934 can indicate if a party is unavailable, available, or unavailable until a particular date. The status data 934 can also define a level of availability. These examples are provided for illustrative purposes and are not to be construed as limiting. It can be appreciated that the status data 934 include a form of data indicating the availability of a company, an individual or a group of individuals. The preference data 929 can include user-defined preferences or provider-defined preferences.

To enable aspects of the techniques disclosed herein, one or more computing devices of FIG. 9 can be configured to generate data defining one or more live updates in response to detecting the presence of a condition. In some configurations, implementations can include receiving scheduling data defining a calendar event. In addition, the implementations can include obtaining contextual data from a plurality of resources. As described in more detail herein, the contextual data can include additional scheduling data, live meeting date, meeting participants, and/or other data that relating to a calendar event.

One or more computing devices can be configured to identify a pattern of the contextual data indicating a presence of a condition that affects one or more aspects of a calendar event. A condition can include the introduction or modification of a calendar event, and/or other events or data that can impact aspects of a calendar event.

Figure 10:
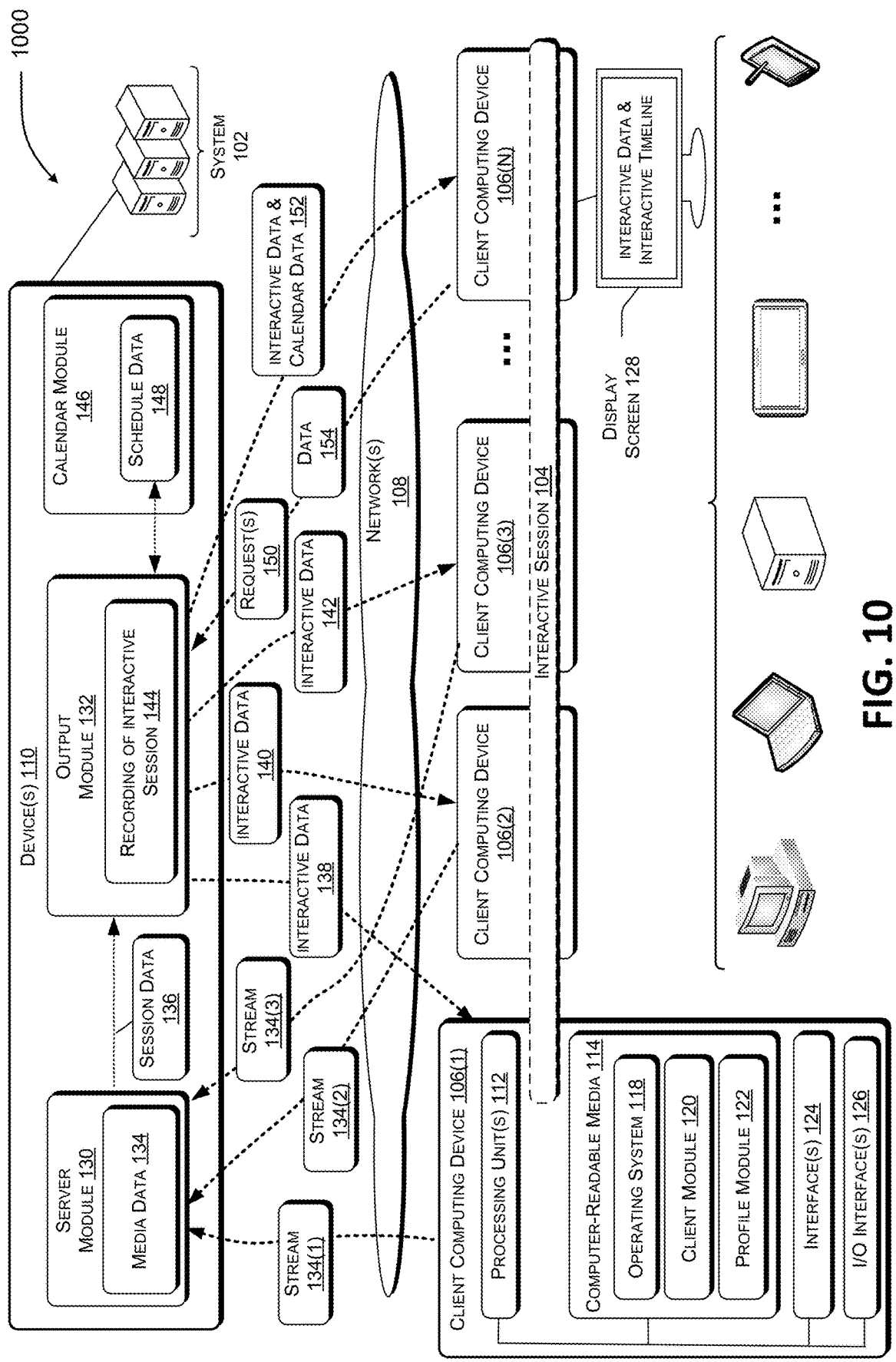
FIG. 10 is a computing system diagram showing aspects of an illustrative operating environment for the technologies disclosed herein.

FIG. 10 is a diagram illustrating an example environment 1000 in which a system 900 can operate to generate calendar information for an interactive session 104 and to save and edit content. In this example, an interactive session 104 is implemented between a number of client computing devices 106(1) through 106(N) (where N is a positive integer number having a value of two or greater). The client computing devices 106(1) through 106(N) enable users to participate in the interactive session 104. In this example, the interactive session 104 is hosted, over one or more network(s) 108, by the system 102. That is, the system 102 can provide a service that enables users of the client computing devices 106(1) through 106(N) to participate in the interactive session 104 (e.g., via a live viewing and/or a recorded viewing). Consequently, a "participant" to the interactive session 104 can comprise a user and/or a client computing device (e.g., multiple users may be in a conference room participating in a interactive session via the use of a single client computing device), each of which can communicate with other participants. As an alternative, the interactive session 104 can be hosted by one of the client computing devices 106(1) through 106(N) utilizing peer-to-peer technologies.

In examples described herein, client computing devices 106(1) through 106(N) participating in an interactive session 104 are configured to receive and render for display, on a user interface of a display screen, interactive data. The interactive data can comprise a collection of various instances, or streams, of content. For example, an individual stream of content can comprise media data associated with a video feed (e.g., audio and visual data that capture the appearance and speech of a user participating in the interactive session). Another example of an individual stream of content can comprise media data that includes a file displayed on a display screen along with audio data that captures the speech of a user. Accordingly, the various streams of content within the teleconference data enable a remote meeting to be facilitated between a group of people and the sharing of content within the group of people.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more interactive sessions such as interactive session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) (each of which are also referred to herein as a "data processing system") may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device (s) 110, over network(s) 108. Such network interface(s) 124 may include one or more network interface controllers (NICs) or other types of transceiver devices to send and receive communications and/or data over a network. Moreover, a client computing device 106(1) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 10 illustrates that client computing device 106(N) is in some way connected to a display device (e.g., a display screen 128), which can display the interactive timeline for the interactive session 104, as shown.

In the example environment 1000 of FIG. 10, client computing devices 106(1) through 106(N) may use their respective client modules 120 to connect with one another and/or other external device(s) in order to participate in the interactive session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for interactive sessions.

As shown in FIG. 10, the device(s) 110 of the system 102 includes a server module 130 and an output module 132. The server module 130 is configured to receive, from individual client computing devices such as client computing devices 106(1) through 106(3), media streams 134(1) through 134(3). As described above, media streams can comprise a video feed (e.g., audio and visual data associated with a user), audio data which is to be output (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 130 is configured to receive a collection of various media streams 134(1) through 134(3) (the collection being referred to herein as media data 134). In some scenarios, not all the client computing devices that participate in the interactive session 104 provide a media stream. For example, a client computing device may only be a consuming, or a "listening", device such that it only receives content associated with the interactive session 104 but does not provide any content to the interactive session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate teleconference data to the client computing devices 106(1) through 106(3). As shown, the output module 132 transmits teleconference data 138 to client computing device 106(1), transmits teleconference data 140 to client computing device 106(2), and transmits interactive data 142 to client computing device 106(3). The interactive data transmitted to the client computing devices can be the same or can be different (e.g., positioning of streams of content within a user interface may vary from one device to the next). The output module 132 is also configured to record the interactive session (e.g., a version of the interactive data) and to maintain a recording of the interactive session 144.

The device(s) 110 can also include a calendar module 146, and in various examples, the calendar module 146 is configured to manage schedule data 148 in the session data 136 and/or events relevant to interactive session 144.

A client computing device such as client computing device 106(N) can provide a request 150 to view a recording of the interactive session 104. In response, the output module 132 can provide interactive data and calendar data 152 to be displayed on a display screen 128 associated with the client computing device 106(N). The teleconference data transmitted to client computing device 106(N) comprises previously recorded content of the interactive session 104. As further described herein, a user of client computing device 106(N) can provide input(s) to add supplemental recorded content to the interactive session 104 and/or to the interactive timeline, and data 154 associated with the supplemental recorded content can be transmitted from client computing device 106(N) to the system 102 so that the recording of the interactive session 144 and the interactive timeline can be updated with the supplemental recorded content. This enables other participants (e.g., users of client computing devices 106(1) through 106(3)) to consume or view the supplemental recorded content after the live viewing of the interactive session has already ended. An improved human-computer interface ("HCI") is disclosed herein for interacting with representations of calendar and calendar content. In some embodiments, the calendar information may be presented in conjunction with a communications platform such as a videoconferencing platform. Such a system may be referred to as an interactive calendaring and scheduling system.

Figure 11:
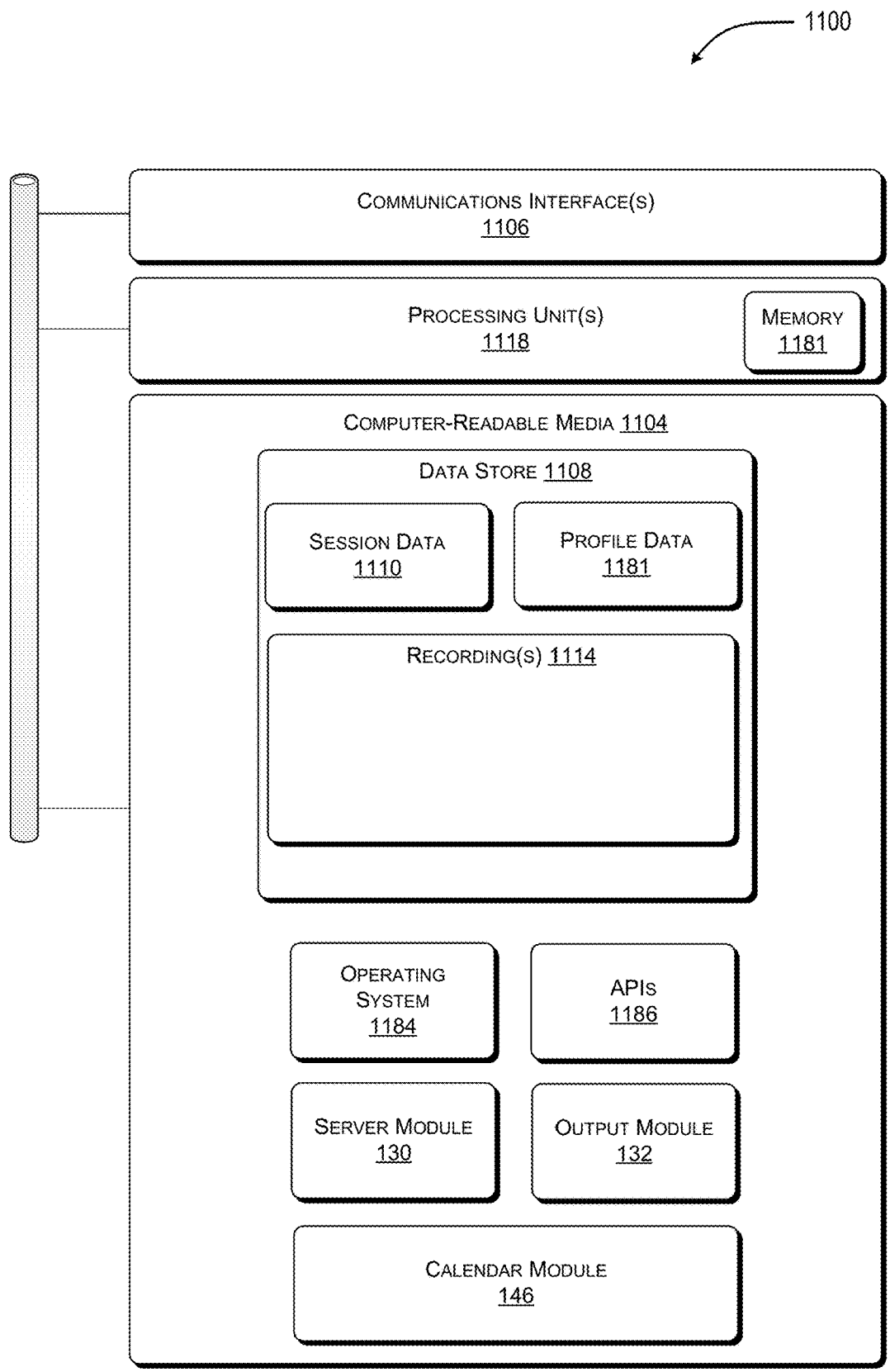
FIG. 11 is a computing device diagram showing aspects of the configuration and operation of a device that can implement aspects of the disclosed technologies, according to one embodiment disclosed herein.

FIG. 11 illustrates a diagram that shows example components of an example device 1100 configured to render and update calendar data. The device 1100 may represent one of device(s) 106, or in other examples a client computing device (e.g., client computing device 106(1)), where the device 1100 includes one or more processing unit(s) 1108, computer-readable media 1104, and communication interface(s) 1106. The components of the device 1100 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 1108 and/or processing unit(s) 1111, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1104, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1106 may represent, for example, network interface controllers ("NICs") or other types of transceiver devices to send and receive communications over a network.

In the illustrated example, computer-readable media 1104 includes a data store 1108. In some examples, data store 1108 includes data storage such as a database, data warehouse, or other type of structured or unstructured data storage. In some examples, data store 1108 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1108 may store data for the operations of processes, applications, components, and/or modules stored in computer-readable media 1104 and/or executed by processing unit(s) 1118 and/or accelerator(s). For instance, in some examples, data store 1108 may store session data 1110 (e.g., session data 136), profile data 1181 (e.g., associated with a participant profile), and/or other data. The session data 1110 can include a total number of participants (e.g., users and/or client computing devices) in the interactive session 104, and activity that occurs in the interactive session 104, and/or other data related to when and how the interactive session 104 is conducted or hosted. The data store 1108 can also include recording(s) 1114 of interactive session(s).

Alternately, some or all of the above-referenced data can be stored on separate memories 1181 on board one or more processing unit(s) 1118 such as a memory on board a CPU-type processor, a GPU-type processor, an FPGA-type accelerator, a DSP-type accelerator, and/or another accelerator. In this example, the computer-readable media 1104 also includes operating system 1184 and application programming interface(s) 1186 configured to expose the functionality and the data of the device 1100 to other devices. Additionally, the computer-readable media 1104 includes one or more modules such as the server module 130, the output module 132, and the calendar module 146, although the number of illustrated modules is just an example, and the number may vary higher or lower. That is, functionality described herein in association with the illustrated modules may be performed by a fewer number of modules or a larger number of modules on one device or spread across multiple devices.

Figure 12:
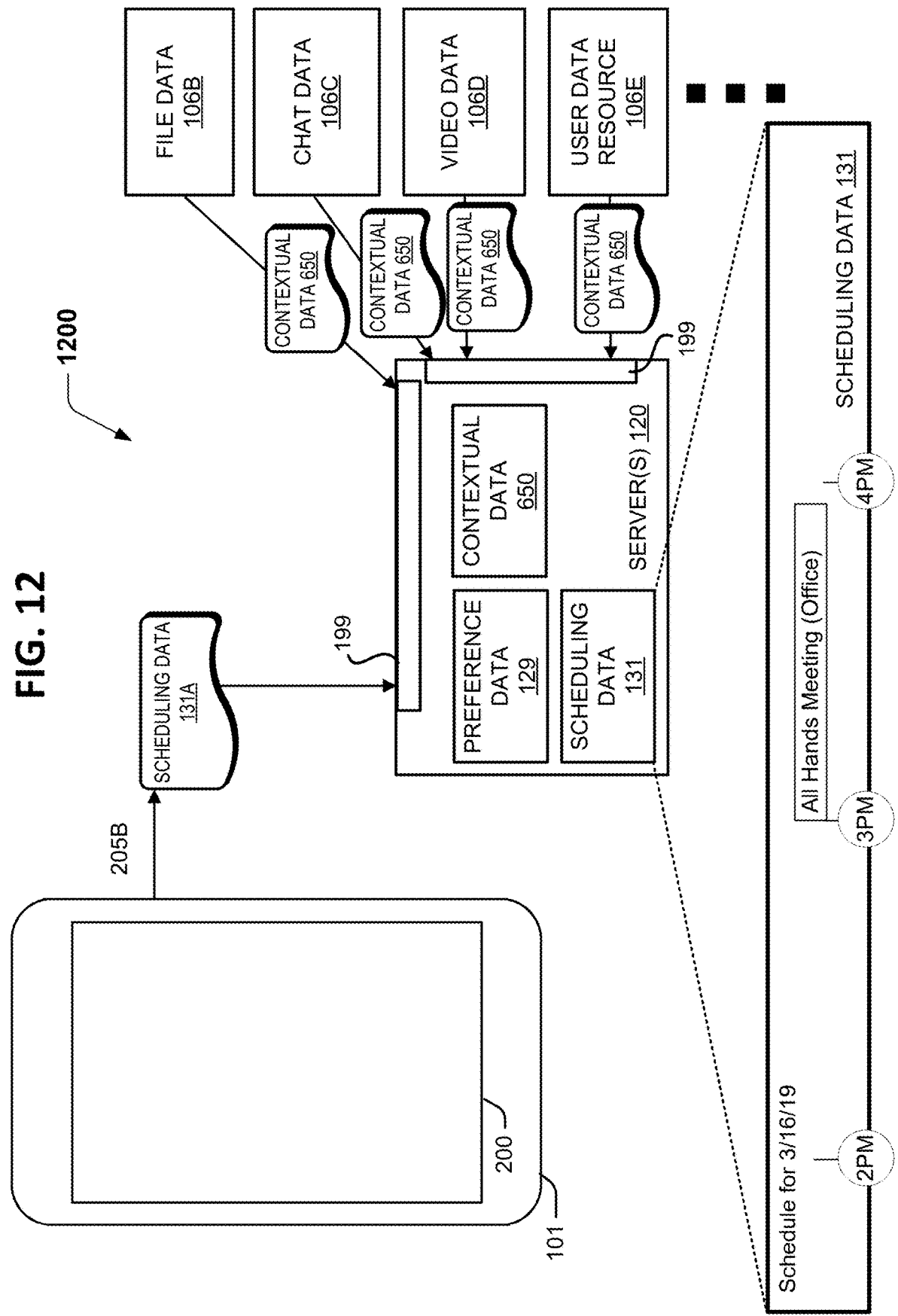
FIG. 12 is a computing system diagram showing aspects of an illustrative operating environment for the technologies disclosed herein.

FIG. 12 illustrates aspects of the system 1200 that provide a framework for several example scenarios utilizing the techniques disclosed herein. More specifically, this block diagram of the system 1200 shows an illustrative example of the server 120 receiving scheduling data 131 defining a scheduled meeting. The server 120 is also storing scheduling data 131 defining a number of calendar events for a user and preference data 129. The server 120 also receives contextual data 650 from a number of resources 106A-106E, as well as other resources described herein. To illustrate aspects of the examples described below, the user device 101 is displaying a user interface (UI) 200 showing a calendar object.

Figure 13:
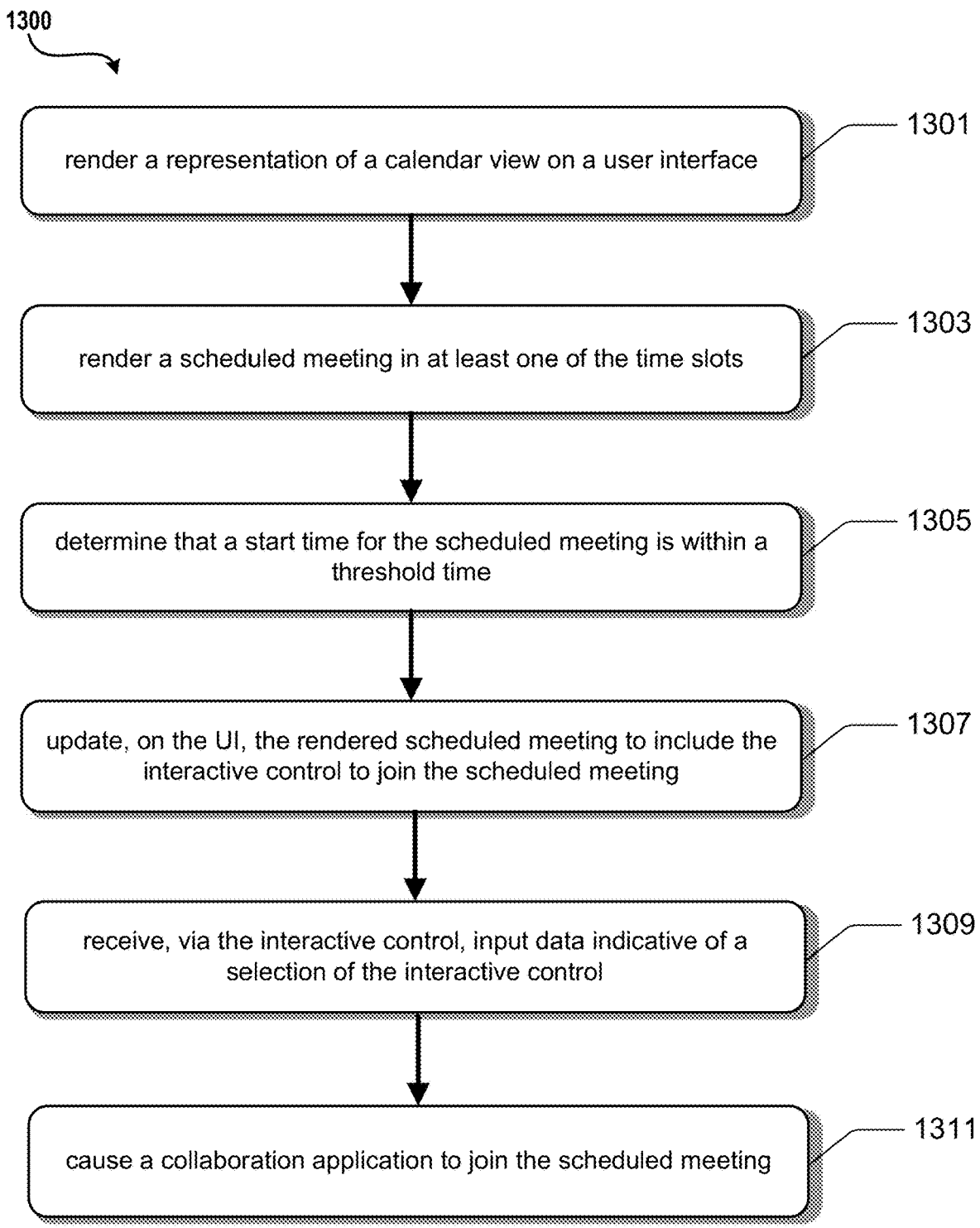
FIG. 13 illustrates aspects of a routine, according to one embodiment disclosed herein.

FIG. 13 is a diagram illustrating aspects of a routine 1300 according to one embodiment disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 13 and the other FIGS. can be implemented in association with the example presentation GUIs described above with respect to FIGS. 1 through 12.

Referring to FIG. 13, operation 1301 illustrates rendering a representation of a calendar view on a user interface (UI). In an embodiment, the calendar view may be indicative of one or more calendar days. Additionally, the calendar days may comprise a time span including a plurality of time slots. Operation 1301 may be followed by operation 1303. Operation 1303 illustrates rendering a representation of a calendar event indicative of a scheduled meeting in at least one of the time slots. In an embodiment, the scheduled meeting may be rendered without an interactive control to join the scheduled meeting. Operation 1303 may be followed by operation 1305. Operation 1305 illustrates determining that a start time for the scheduled meeting is within a threshold time. Operation 1305 may be followed by operation 1307. Operation 1307 illustrates in response to determining that the start time for the scheduled meeting is within the threshold time, updating the rendering to include the interactive control to join the scheduled meeting. In an embodiment, the interactive control may include at least a selectable region that is configured to indicate that the scheduled meeting is to be joined. Operation 1307 may be followed by operation 1309. Operation 1309 illustrates receiving, via the interactive control, input data indicative of an activation of the interactive control. Operation 1309 may be followed by operation 1311. Operation 1311 illustrates in response the input data, causing a collaboration application to join the scheduled meeting.

Figure 14:
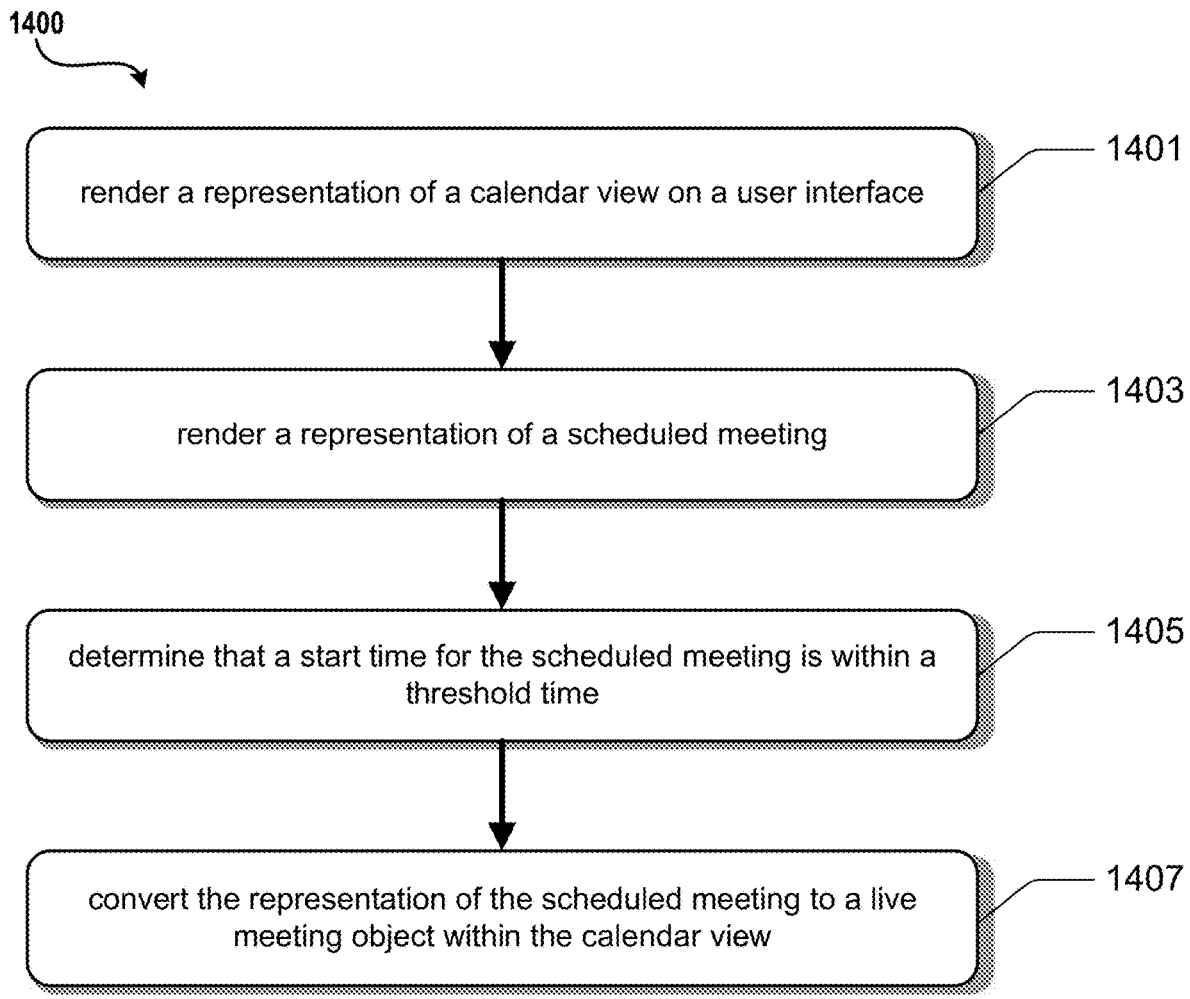
FIG. 14 illustrates aspects of a routine, according to one embodiment disclosed herein.

FIG. 14 is a diagram illustrating aspects of a routine 1400 for interacting with a rendered environment, according to one embodiment disclosed herein. Referring to FIG. 14, operation 1401 illustrates rendering a representation of a calendar view on a user interface (UI). In an embodiment, the calendar view may be indicative of one or more calendar days. The calendar days may further comprise a time span including a plurality of time slots. Operation 1401 may be followed by operation 1403. Operation 1403 illustrates rendering a representation of a scheduled meeting in at least one of the time slots. In an embodiment, the scheduled meeting may be rendered without an interactive control to join the scheduled meeting. Operation 1403 may be followed by operation 1405. Operation 1405 illustrates determining that a start time for the scheduled meeting is within a threshold time. Operation 1405 may be followed by operation 1407. Operation 1407 illustrates in response to determining that the start time for the scheduled meeting is within the threshold time, converting the representation of the scheduled meeting to a live meeting object within the calendar view.

Figure 15:
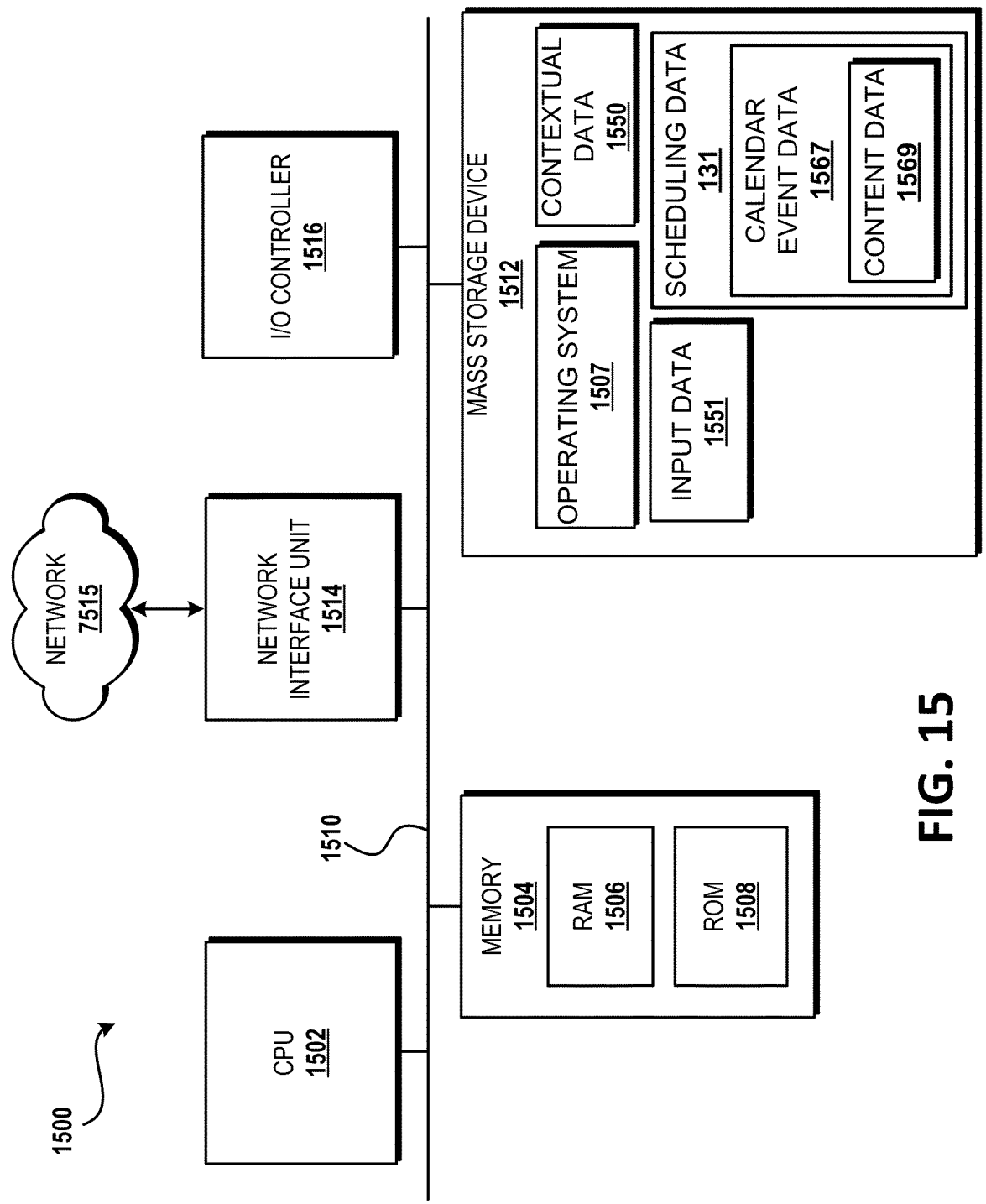
FIG. 15 is a computing system diagram showing aspects of an illustrative operating environment for the technologies disclosed herein.

FIG. 15 shows additional details of an example computer architecture 1500 for a computer, such as any of the computing devices depicted in FIGS. 1-14, capable of executing the program components described herein. Thus, the computer architecture 1500 illustrated in FIG. 15 illustrates an architecture for a server computer, mobile phone, a PDA, a smart phone, a desktop computer, a netbook computer, a tablet computer, and/or a laptop computer. The computer architecture 1500 may be utilized to execute any aspects of the software components presented herein.

The computer architecture 1500 illustrated in FIG. 15 includes a central processing unit 1502 ("CPU"), a system memory 1504, including a random access memory 15015 ("RAM") and a read-only memory ("ROM") 1508, and a system bus 1510 that couples the memory 1504 to the CPU 1502. A basic input/output system containing the basic routines that help to transfer information between elements within the computer architecture 1500, such as during startup, is stored in the ROM 1508. The computer architecture 1500 further includes a mass storage device 1512 for storing an operating system 1507, data, such as the contextual data 1550, input data 1551, scheduling data 131, calendar event 1567, content data 1569, and one or more application programs (not depicted in FIG. 15).

The mass storage device 1512 is connected to the CPU 1502 through a mass storage controller (not shown) connected to the bus 1510. The mass storage device 1512 and its associated computer-readable media provide non-volatile storage for the computer architecture 1500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1500. For purposes the claims, the phrase "computer storage medium," "computer-readable storage medium" and variations thereof, does not include waves, signals, and/or other transitory and/or intangible communication media, per se.

According to various configurations, the computer architecture 1500 may operate in a networked environment using logical connections to remote computers through the network 7515 and/or another network (not shown). The computer architecture 1500 may connect to the network 7515 through a network interface unit 1514 connected to the bus 1510. It should be appreciated that the network interface unit 1514 also may be utilized to connect to other types of networks and remote computer systems. The computer architecture 1500 also may include an input/output controller 1516 for receiving and processing input from a number of other devices, including a keyboard, mouse, or electronic stylus (not shown in FIG. 15). Similarly, the input/output controller 1516 may provide output to a display screen, a printer, or other type of output device (also not shown in FIG. 15).

It should be appreciated that the software components described herein may, when loaded into the CPU 1502 and executed, transform the CPU 1502 and the overall computer architecture 1500 from a general-purpose computing system into a special-purpose computing system customized to facilitate the functionality presented herein. The CPU 1502 may be constructed from any number of transistors or other discrete circuit elements, which may individually or collectively assume any number of states. More specifically, the CPU 1502 may operate as a finite-state machine, in response to executable instructions contained within the software modules disclosed herein. These computer-executable instructions may transform the CPU 1502 by specifying how the CPU 1502 transitions between states, thereby transforming the transistors or other discrete hardware elements constituting the CPU 1502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1500 in order to store and execute the software components presented herein. It also should be appreciated that the computer architecture 1500 may include other types of computing devices, including hand-held computers, embedded computer systems, personal digital assistants, and other types of computing devices known to those skilled in the art. It is also contemplated that the computer architecture 1500 may not include all of the components shown in FIG. 15, may include other components that are not explicitly shown in FIG. 15, or may utilize an architecture completely different than that shown in FIG. 15.

Figure 16:
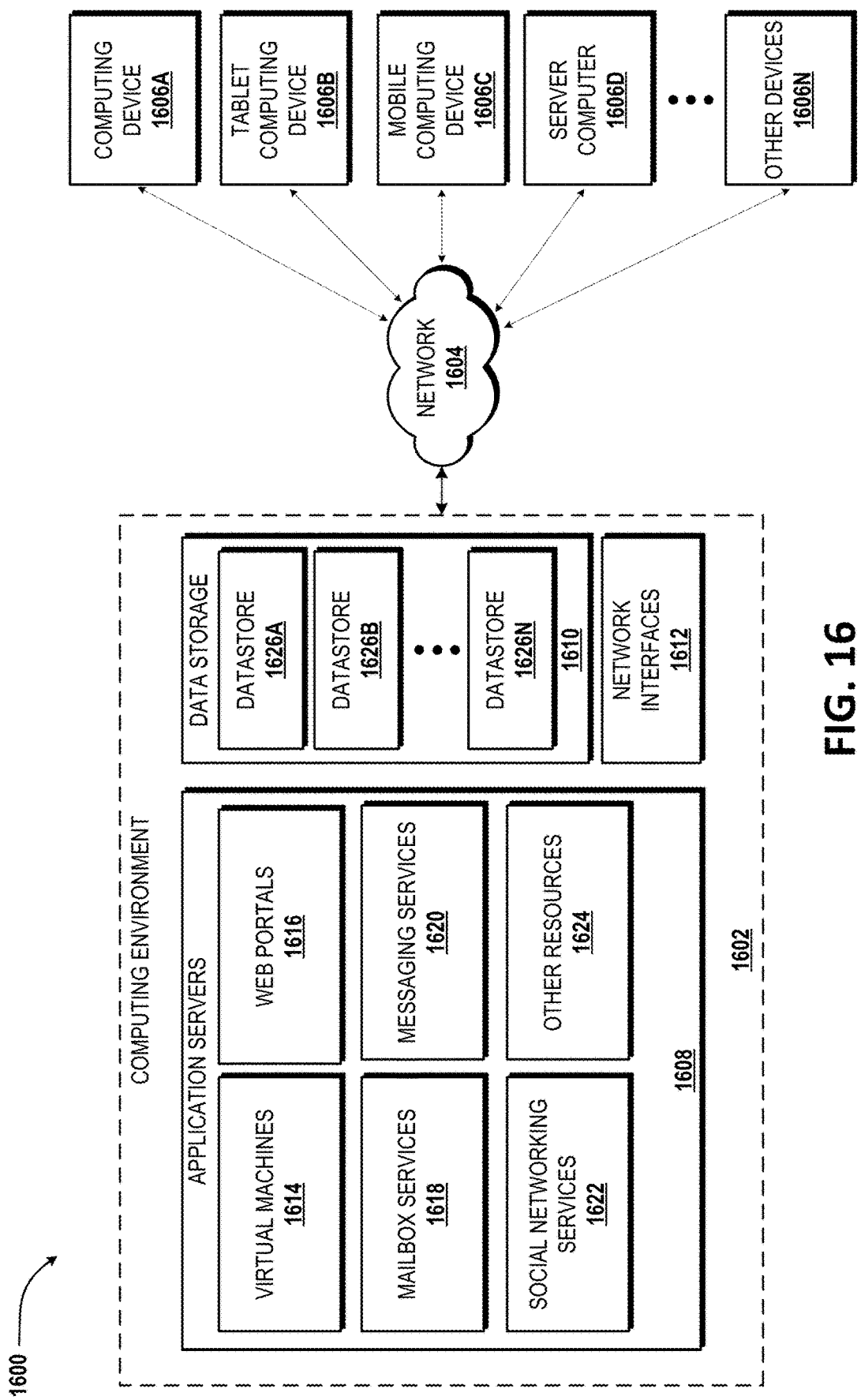
FIG. 16 is a computing device diagram showing aspects of the configuration and operation of a device that can implement aspects of the disclosed technologies, according to one embodiment disclosed herein.

FIG. 16 depicts an illustrative distributed computing environment 1600 capable of executing the software components described herein for providing contextually-aware insights into calendar events. Thus, the distributed computing environment 1600 illustrated in FIG. 16 can be utilized to execute any aspects of the software components presented herein. For example, the distributed computing environment 1600 can be utilized to execute aspects of the software components described herein.

According to various implementations, the distributed computing environment 1600 includes a computing environment 1602 operating on, in communication with, or as part of the network 1604. The network 1604 may be or may include the network 1656, described above. The network 1604 also can include various access networks. One or more client devices 1606A-1606N (hereinafter referred to collectively and/or generically as "clients 1606") can communicate with the computing environment 1602 via the network 1604 and/or other connections (not illustrated in FIG. 16). In one illustrated configuration, the clients 1606 include a computing device 1606A such as a laptop computer, a desktop computer, or other computing device; a slate or tablet computing device ("tablet computing device") 1606B; a mobile computing device 1606C such as a mobile telephone, a smart phone, or other mobile computing device; a server computer 1606D; and/or other devices 1606N. It should be understood that any number of clients 1606 can communicate with the computing environment 1602. Two example computing architectures for the clients 1606 are illustrated and described herein with reference to FIGS. 1-15. It should be understood that the illustrated clients 1606 and computing architectures illustrated and described herein are illustrative, and should not be construed as being limited in any way.

In the illustrated configuration, the computing environment 1602 includes application servers 1608, data storage 1610, and one or more network interfaces 1612. According to various implementations, the functionality of the application servers 1608 can be provided by one or more server computers that are executing as part of, or in communication with, the network 1604. The application servers 1608 can host various services, virtual machines, portals, and/or other resources. In the illustrated configuration, the application servers 1608 host one or more virtual machines 1614 for hosting applications or other functionality. According to various implementations, the virtual machines 1614 host one or more applications and/or software modules for providing contextually-aware insights into calendar events. It should be understood that this configuration is illustrative, and should not be construed as being limiting in any way. The application servers 1608 also host or provide access to one or more portals, link pages, Web sites, and/or other information ("Web portals") 1616.

According to various implementations, the application servers 1608 also include one or more mailbox services 1618 and one or more messaging services 1620. The mailbox services 1618 can include electronic mail ("email") services. The mailbox services 1618 also can include various personal information management ("PIM") services including, but not limited to, calendar services, contact management services, collaboration services, and/or other services. The messaging services 1620 can include, but are not limited to, instant messaging services, chat services, forum services, and/or other communication services.

The application servers 1608 also may include one or more social networking services 1622. The social networking services 1622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1622 are not mentioned herein for the sake of brevity. As such, the above configurations are illustrative, and should not be construed as being limited in any way. According to various implementations, the social networking services 1622 may host one or more applications and/or software modules for providing the functionality described herein for providing contextually-aware insights into calendar events. For instance, any one of the application servers 1608 may communicate or facilitate the functionality and features described herein. For instance, a social networking application, mail client, messaging client or a browser running on a phone or any other client 1606 may communicate with a networking service 1622 and facilitate the functionality, even in part, described above with respect to FIGS. 1-15.

As shown in FIG. 16, the application servers 1608 also can host other services, applications, portals, and/or other resources ("other resources") 1624. The other resources 1624 can include, but are not limited to, document sharing, rendering or any other functionality. It thus can be appreciated that the computing environment 1602 can provide integration of the concepts and technologies disclosed herein provided herein with various mailbox, messaging, social networking, and/or other services or resources.

As mentioned above, the computing environment 1602 can include the data storage 1610. According to various implementations, the functionality of the data storage 1610 is provided by one or more databases operating on, or in communication with, the network 1604. The functionality of the data storage 1610 also can be provided by one or more server computers configured to host data for the computing environment 1602. The data storage 1610 can include, host, or provide one or more real or virtual data stores 1626A-1626N (hereinafter referred to collectively and/or generically as "datastores 1626"). The datastores 1626 are configured to host data used or created by the application servers 1608 and/or other data. Although not illustrated in FIG. 16, the datastores 1626 also can host or store web page documents, word documents, presentation documents, data structures, algorithms for execution by a recommendation engine, and/or other data utilized by any application program or another module. Aspects of the datastores 1626 may be associated with a service for storing files.

The computing environment 1602 can communicate with, or be accessed by, the network interfaces 1612. The network interfaces 1612 can include various types of network hardware and software for supporting communications between two or more computing devices including, but not limited to, the clients 1606 and the application servers 1608. It should be appreciated that the network interfaces 1612 also may be utilized to connect to other types of networks and/or computer systems.

It should be understood that the distributed computing environment 1600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1600 provides the software functionality described herein as a service to the clients 1606. It should be understood that the clients 1606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1600 to utilize the functionality described herein for providing contextually-aware insights into calendar events, among other aspects.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should be also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Among many other technical benefits, the technologies herein enable more efficient use of computing resources such as processor cycles, memory, network bandwidth, and power, as compared to previous solutions relying upon inefficient manual placement of virtual objects in a 3D environment. Other technical benefits not specifically mentioned herein can also be realized through implementations of the disclosed subject matter.

Although the techniques have been described in language specific to structural features and/or methodological acts, it is to be understood that the appended claims are not necessarily limited to the features or acts described. Rather, the features and acts are described as example implementations of such techniques.

EXAMPLE CLAUSES

The disclosure presented herein encompasses the subject matter set forth in the following example clauses.

Example Clause A, a system comprising:
one or more data processing units; and
a computer-readable medium having encoded thereon computer-executable instructions to cause the one or more data processing units to:

render a representation of a calendar view on a user interface (UI), the calendar view indicative of one or more calendar days, the calendar days comprising a time span including a plurality of time slots;

render a representation of a calendar event indicative of a scheduled meeting in at least one of the time slots, wherein the scheduled meeting is rendered without an interactive control to join the scheduled meeting;

determine that a start time for the scheduled meeting is within a threshold time;

in response to determining that the start time for the scheduled meeting is within the threshold time, update the rendering to include the interactive control to join the scheduled meeting, the interactive control having at least a selectable region that is configured to indicate that the scheduled meeting is to be joined;

receive, via the interactive control, input data indicative of an activation of the interactive control; and in response the input data, cause a collaboration application to join the scheduled meeting.

Example Clause B, the system of Example Clause A, wherein the instructions further cause the one or more data processing units to:

in response to determining that the start time for the scheduled meeting is within the threshold time, update the rendered scheduled meeting to visually indicate that the scheduled meeting is within the threshold time.

Example Clause C, the system of any one of Example Clauses A through B, wherein the instructions further cause the one or more data processing units to:

determine that the scheduled meeting is no longer active; and in response to the determining that the scheduled meeting is no longer active, update, on the UI, the rendering to remove the interactive control to join the scheduled meeting.

Example Clause D, the system of any one of Example Clauses A through C, wherein the instructions further cause the one or more data processing units to:

determine that the scheduled meeting is no longer active; and in response to the determining that the scheduled meeting is no longer active, update the rendering to visually indicate that the scheduled meeting is no longer active.

Example Clause E, the system of any one of Example Clauses A through D, wherein the instructions further cause the one or more data processing units to:

in response to the determining that the start time for the scheduled meeting is within the threshold time, update the rendered scheduled meeting to visually indicate one or more participants who have joined the scheduled meeting.

Example Clause F, the system of any one of Example Clauses A through E, wherein the instructions further cause the one or more data processing units to:

in response to the determining that the start time for the scheduled meeting is within the threshold time, update the rendered scheduled meeting to visually indicate a live image of the scheduled meeting.

Example Clause G, the system of any one of Example Clauses A through F, wherein the instructions further cause the one or more data processing units to:

in response to the determining that the start time for the scheduled meeting is within the threshold time, update the rendered scheduled meeting to include a preview icon configured to launch a preview of recent messages associated with the scheduled meeting.

Example Clause H, the system of any one of Example Clauses A through G, wherein the instructions further cause the one or more data processing units to:

in response to the determining that the start time for the scheduled meeting is within the threshold time, update the rendered scheduled meeting to include a files icon configured to indicate that a new file has been added that is associated with the scheduled meeting.

Example Clause I, the system of any one of Example Clauses A through H, wherein the instructions further cause the one or more data processing units to:

in response to the determining that the start time for the scheduled meeting is within the threshold time, update the rendered scheduled meeting to include a notes icon configured to indicate that new notes have been added that are associated with the scheduled meeting.

While Example Clauses A through I are described above with respect to a system, it is understood in the context of this disclosure that the subject matter of Example Clauses A through I can additionally or alternatively be implemented by a method or device.

Example Clause J, a method to be performed by a data processing system, the method comprising:

rendering a representation of a calendar view on a user interface (UI), the calendar view indicative of one or more calendar days, the calendar days comprising a time span including a plurality of time slots;

rendering a representation of a scheduled meeting in at least one of the time slots, wherein the scheduled meeting is rendered without an interactive control to join the scheduled meeting;

determining that a start time for the scheduled meeting is within a threshold time;

in response to determining that the start time for the scheduled meeting is within the threshold time, updating, on the UI, the rendered scheduled meeting to include the interactive control to join the scheduled meeting, the interactive control having at least a selectable region that is configured to indicate that the scheduled meeting is to be joined;

receiving, via the interactive control, input data indicative of a selection of the interactive control; and in response the input data, causing a collaboration application to join the scheduled meeting.

Example Clause K, the method of Example Clause J further comprising:

in response to the determining that the start time for the scheduled meeting is within the threshold time, updating the rendered scheduled meeting to include a whiteboard icon configured to indicate that a new whiteboard has been added that is associated with the scheduled meeting.

Example Clause L, the method of any one of Example Clauses I through K, further comprising:

in response to the determining that the start time for the scheduled meeting is within the threshold time, updating the rendered scheduled meeting to include a chat icon configured to indicate that recent chat activity is available that is associated with the scheduled meeting.

Example Clause M, the method of any one of Example Clauses I through L, further comprising updating the rendered scheduled meeting to include a share icon configured to, when the share icon is selected, cause the scheduled meeting to be forwarded to selected participants.

Example Clause N, the method of any one of Example Clauses I through M, further comprising:

in response to the determining that the start time for the scheduled meeting is within the threshold time, updating the rendered scheduled meeting to include a recording icon configured to indicate that a recording is available for viewing that is associated with the scheduled meeting.

Example Clause O, the method of any one of Example Clauses I through N, further comprising:

determining that the scheduled meeting is no longer active; and in response to the determining that the scheduled meeting is no longer active, updating, on the UI, the rendered scheduled meeting to remove the interactive control to join the scheduled meeting.

Example Clause P, the method of any one of Example Clauses I through O, further comprising:

in response to the determining that the scheduled meeting is no longer active, updating the rendered scheduled meeting to include a recording icon configured to indicate that a recording is available for viewing that is associated with the scheduled meeting.

While Example Clauses J through P are described above with respect to a method, it is understood in the context of this disclosure that the subject matter of Example Clauses J through P can additionally or alternatively be implemented by a system or device.

Example Clause Q, a system, comprising:

means for rendering a representation of a calendar view on a user interface (UI), the calendar view indicative of one or more calendar days, the calendar days comprising a time span including a plurality of time slots;

means for rendering a representation of a scheduled meeting in at least one of the time slots, wherein the scheduled meeting is rendered without an interactive control to join the scheduled meeting;

means for determining that a start time for the scheduled meeting meets one or more criteria;

in response to determining that the start time for the scheduled meeting meets the one or more criteria, means for updating, on the UI, the rendering to include the interactive control to join the scheduled meeting, the interactive control having at least a selectable region that is configured to indicate that the scheduled meeting is to be joined;

means for receiving, via the interactive control, input data indicative of an activation of the interactive control; and in response the input data, means for causing a collaboration application to join the scheduled meeting.

Example Clause R, the system of Example Clause Q, further comprising:

in response to the determining that the start time for the scheduled meeting meets the one or more criteria, means for updating the rendered scheduled meeting to visually indicate an elapsed time for the scheduled meeting.

Example Clause S, the system of any of Example Clauses Q through R, further comprising:

in response to the determining that the start time for the scheduled meeting meets the one or more criteria, means for updating the rendered scheduled meeting to visually indicate that the scheduled meeting is within the threshold time.

Example Clause T, the system of any one of Example Clauses Q through S, further comprising:

means for determining that the scheduled meeting is no longer active; and in response to the determining that the scheduled meeting is no longer active, means for updating, on the UI, the rendered scheduled meeting to remove the interactive control to join the scheduled meeting.

While Example Clauses Q through T are described above with respect to a system, it is understood in the context of this disclosure that the subject matter of Example Clauses Q through T can additionally or alternatively be implemented by a method or via a device.

The disclosure presented herein encompasses the subject matter set forth in the following example clauses.

Example Clause AA, a system comprising:
one or more data processing units; and
a computer-readable medium having encoded thereon computer-executable instructions to cause the one or more data processing units to:
render a representation of a calendar view on a user interface (UI), the calendar view indicative of one or more calendar days, the calendar days comprising a time span including a plurality of time slots;
render a representation of a scheduled meeting in at least one of the time slots, wherein the scheduled meeting is rendered without an interactive control to join the scheduled meeting;
determine that a start time for the scheduled meeting is within a threshold time; and
in response to determining that the start time for the scheduled meeting is within the threshold time, convert the representation of the scheduled meeting to a live meeting object within the calendar view.

Example Clause BB, the system of Example Clause AA wherein the instructions further cause the one or more data processing units to:
update the live meeting object to include a control to join the scheduled meeting, the control having at least a selectable region that is configured to indicate that the scheduled meeting is to be joined.

Example Clause CC, the system of any one of Example Clauses AA through BB, wherein the instructions further cause the one or more data processing units to:
in response to determining that the start time for the scheduled meeting is within the threshold time, update the live meeting object to visually indicate that the scheduled meeting is within the threshold time.

Example Clause DD, the system of any one of Example Clauses AA through CC, wherein the instructions further cause the one or more data processing units to:
determine that the scheduled meeting is no longer active; and
in response to the determining that the scheduled meeting is no longer active, update the live meeting object to remove the interactive control to join the scheduled meeting.

Example Clause EE, the system of any one of Example Clauses AA through DD, wherein the instructions further cause the one or more data processing units to:
determine that the scheduled meeting is no longer active; and
in response to the determining that the scheduled meeting is no longer active, update the live meeting object to visually indicate that the scheduled meeting is no longer active.

Example Clause FF, the system of any one of Example Clauses AA through EE, wherein the instructions further cause the one or more data processing units to:
in response to determining that the start time for the scheduled meeting is within the threshold time, update the live meeting object to indicate one or more participants who have joined the scheduled meeting.

Example Clause GG, the system of any one of Example Clauses AA through FF, wherein the instructions further cause the one or more data processing units to:
in response to determining that the start time for the scheduled meeting is within the threshold time, update the live meeting object to render a video image of the scheduled meeting.

Example Clause HH, the system of any one of Example Clauses AA through GG, wherein the instructions further cause the one or more data processing units to:
in response to determining that the start time for the scheduled meeting is within the threshold time, update the live meeting object to include a preview control configured to launch a preview of recent messages associated with the scheduled meeting.

Example Clause II, the system of any one of Example Clauses AA through HH, wherein the instructions further cause the one or more data processing units to:
receive input data indicative of a change in perspective of the representation; and
in response to the change in perspective, automatically reposition the zoom window to maintain the view of the portion of the representation.

While Example Clauses AA through II are described above with respect to a system, it is understood in the context of this disclosure that the subject matter of Example Clauses AA through II can additionally or alternatively be implemented by a method or device.

Example Clause JJ, a method to be performed by a data processing system, the method comprising:
rendering a representation of a calendar view on a user interface (UI), the calendar view indicative of one or more calendar days, the calendar days comprising a time span including a plurality of time slots;
rendering a representation of a scheduled meeting in at least one of the time slots;
determining that a start time for the scheduled meeting meets one or more criteria;
in response to determining that the start time for the scheduled meeting meets the one or more criteria, converting the representation of the scheduled meeting to a live meeting object within the calendar view, wherein the live meeting object includes a control to join the scheduled meeting;
receiving, via the control, input data indicative of an activation of the control; and
in response the input data, causing a collaboration application to join the scheduled meeting.

Example Clause KK, the method of Example Clause JJ further comprising:
in response to determining that the start time for the scheduled meeting meets the one or more criteria, updating the live meeting object to include a whiteboard icon configured to indicate that a new whiteboard has been added that is associated with the scheduled meeting.

Example Clause LL, the method of any one of Example Clauses II through KK, further comprising:
in response to determining that the start time for the scheduled meeting meets one or more criteria, updating the live meeting object to include a chat icon configured to indicate that recent chat activity is available that is associated with the scheduled meeting.

Example Clause MM, the method of any one of Example Clauses II through LL, further comprising updating the live meeting object to include a share icon configured to, when selected, cause the scheduled meeting to be forwarded to selected participants.

Example Clause NN, the method of any one of Example Clauses II through MM, further comprising:

in response to determining that the start time for the scheduled meeting meets the one or more criteria, updating the live meeting object to include a recording icon configured to indicate that a recording is available for viewing that is associated with the scheduled meeting.

Example Clause OO, the method of any one of Example Clauses II through NN, further comprising:

determining that the scheduled meeting is no longer active; and in response to the determining that the scheduled meeting is no longer active, updating the live meeting object to remove the control to join the scheduled meeting.

Example Clause PP, the method of any one of Example Clauses II through NN, further comprising:

in response to determining that the start time for the scheduled meeting meets one or more criteria, updating the live meeting object to include a notes control configured to indicate that new notes have been added that are associated with the scheduled meeting.

While Example Clauses JJ through PP are described above with respect to a method, it is understood in the context of this disclosure that the subject matter of Example Clauses JJ through PP can additionally or alternatively be implemented by a system or device.

Example Clause QQ, a system comprising:

means for rendering a representation of a calendar view on a user interface (UI), the calendar view indicative of one or more calendar days, the calendar days comprising a time span including a plurality of time slots;

means for rendering a representation of a scheduled meeting in at least one of the time slots;

means for determining that a start time for the scheduled meeting is within a threshold time;

in response to determining that the start time for the scheduled meeting is within the threshold time, means for converting the representation of the scheduled meeting to a live meeting object within the calendar view, wherein the live meeting object includes a control to join the scheduled meeting;

means for receiving, via the control, input data indicative of a selection of the control;

and in response the input data, means for causing a collaboration application to join the scheduled meeting.

Example Clause RR, the system of Example Clause QQ, further comprising:

in response to determining that the start time for the scheduled meeting is within the threshold time, means for updating the live meeting object to visually indicate an elapsed time for the scheduled meeting.

Example Clause SS, the system of any one of Example Clauses QQ through RR, further comprising:

in response to determining that the start time for the scheduled meeting is within the threshold time, means for updating the live meeting object to visually indicate that the scheduled meeting is within the threshold time.

Example Clause TT, the system of any one of Example Clauses QQ through SS, further comprising:

means for determining that the scheduled meeting is no longer active; and in response to the determining that the scheduled meeting is no longer active, means for updating the live meeting object to remove the control to join the scheduled meeting.

While Example Clauses QQ through TT are described above with respect to a system, it is understood in the context of this disclosure that the subject matter of Example Clauses QQ through TT can additionally or alternatively be implemented by a method or via a device.

The invention claimed is:

1. A system comprising:
one or more data processing units; and
a computer-readable medium having encoded thereon computer-executable instructions to cause the one or more data processing units to:
render a representation of a calendar view on a user interface (UI), the calendar view indicative of one or more calendar days, the calendar days comprising a time span including a plurality of sequential time slots;
render, within the calendar view comprising the time span including the plurality of sequential time slots, a representation of a scheduled meeting in at least one of the sequential time slots, wherein the scheduled meeting is rendered without an icon or button operative to provide an interactive control to join the scheduled meeting;
determine that the scheduled meeting has started; and
in response to determining that the scheduled meeting has started, convert the representation of the scheduled meeting to a live meeting object and replace, within the calendar view, the representation of the scheduled meeting with the converted live meeting object, the live meeting object rendering a live video or audio output of the scheduled meeting.

2. The system of claim 1, wherein the instructions further cause the one or more data processing units to:
update the live meeting object to include a control to join the scheduled meeting, the control having at least a selectable region that is configured to indicate that the scheduled meeting is to be joined.

3. The system of claim 2, wherein the instructions further cause the one or more data processing units to:
determine that the scheduled meeting is no longer active; and
in response to the determining that the scheduled meeting is no longer active, update the live meeting object to remove the control to join the scheduled meeting.

4. The system of claim 1, wherein the instructions further cause the one or more data processing units to:
in response to determining that a start time for the scheduled meeting is within a threshold time, update the live meeting object to visually indicate that the scheduled meeting is within the threshold time.

5. The system of claim 4, wherein the instructions further cause the one or more data processing units to:
determine that the scheduled meeting is no longer active; and
in response to the determining that the scheduled meeting is no longer active, update the live meeting object to visually indicate that the scheduled meeting is no longer active.

6. The system of claim 1, wherein the instructions further cause the one or more data processing units to:
in response to determining that the scheduled meeting has started, update the live meeting object to indicate one or more participants who have joined the scheduled meeting.

7. The system of claim 1, wherein the instructions further cause the one or more data processing units to:
determine that the scheduled meeting is no longer active; and
in response to the determining that the scheduled meeting is no longer active, update the live meeting object to discontinue rendering the live video or audio output of the scheduled meeting.

8. The system of claim 1, wherein the instructions further cause the one or more data processing units to:

in response to determining that a start time for the scheduled meeting is within a threshold time, update the live meeting object to include a preview control configured to launch a preview of recent messages associated with the scheduled meeting.

9. The system of claim 1, wherein the instructions further cause the one or more data processing units to:
in response to the determining that a start time for the scheduled meeting is within a threshold time, update the live meeting object to include a notes control configured to indicate that new notes have been added that are associated with the scheduled meeting.

10. A method to be performed by a data processing system, the method comprising:
rendering a representation of a calendar view on a user interface (UI), the calendar view indicative of one or more calendar days, the calendar days comprising a time span including a plurality of sequential time slots;
rendering, within the calendar view comprising the time span including the plurality of sequential time slots, a representation of a scheduled meeting in at least one of the sequential time slots;
determining that a start time for the scheduled meeting meets one or more criteria; and
in response to determining that the start time for the scheduled meeting meets the one or more criteria, converting the representation of the scheduled meeting to a live meeting object and replace, within the calendar view, the representation of the scheduled meeting with the converted live meeting object, the live meeting object rendering a live video or audio output of the scheduled meeting.

11. The method of claim 10, further comprising:
wherein the live meeting object includes an icon or button operative to provide a control to join the scheduled meeting;
receiving, via the control, input data indicative of an activation of the control; and
in response to the input data, causing a collaboration application to join the scheduled meeting.

12. The method of claim 10, further comprising:
in response to determining that the start time for the scheduled meeting meets the one or more criteria, updating the live meeting object to include a whiteboard icon configured to indicate that a new whiteboard has been added that is associated with the scheduled meeting.

13. The method of claim 10, further comprising:
in response to determining that the start time for the scheduled meeting meets one or more criteria, updating the live meeting object to include a chat icon configured to indicate that recent chat activity is available that is associated with the scheduled meeting.

14. The method of claim 10, further comprising updating the live meeting object to include a share icon configured to, when selected, cause the scheduled meeting to be forwarded to selected participants.

15. The method of claim 10, further comprising:
in response to determining that the start time for the scheduled meeting meets the one or more criteria, updating the live meeting object to include a recording icon configured to indicate that a recording that is associated with the scheduled meeting is available.

16. The method of claim 10, further comprising:
in response to determining that the start time for the scheduled meeting meets one or more criteria, updating the live meeting object to include a notes control configured to indicate that new notes have been added that are associated with the scheduled meeting.

17. A system, comprising:
means for rendering a representation of a calendar view on a user interface (UI), the calendar view indicative of one or more calendar days, the calendar days comprising a time span including a plurality of sequential time slots;
means for rendering, within the calendar view comprising the time span including the plurality of sequential time slots, a representation of a scheduled meeting in at least one of the sequential time slots;
means for determining that a start time for the scheduled meeting is within a threshold time; and
in response to determining that the start time for the scheduled meeting is within the threshold time, means for converting the representation of the scheduled meeting to a live meeting object and replace, within the calendar view, the representation of the scheduled meeting with the converted live meeting object, the live meeting object rendering a live video or audio output of the scheduled meeting.

18. The system of claim 17, further comprising:
in response to determining that the start time for the scheduled meeting is within the threshold time, means for updating the live meeting object to visually indicate an elapsed time for the scheduled meeting.

19. The system of claim 17, further comprising:
in response to determining that the start time for the scheduled meeting is within the threshold time, means for updating the live meeting object to visually indicate that the scheduled meeting is within the threshold time.

20. The system of claim 17, further comprising:
means for determining that the scheduled meeting is no longer active; and
in response to the determining that the scheduled meeting is no longer active, means for updating the live meeting object to discontinue rendering the live video or audio output of the scheduled meeting.

* * * * *